(12) United States Patent
Estey

(10) Patent No.: US 11,007,923 B2
(45) Date of Patent: May 18, 2021

(54) TAILGATE SAVER SYSTEM AND METHOD

(71) Applicant: Shawn Michael Estey, Iowa Falls, IA (US)

(72) Inventor: Shawn Michael Estey, Iowa Falls, IA (US)

( * ) Notice: Subject to any disclaimer, the term of this patent is extended or adjusted under 35 U.S.C. 154(b) by 0 days.

(21) Appl. No.: 16/512,515

(22) Filed: Jul. 16, 2019

(65) Prior Publication Data

US 2020/0017018 A1  Jan. 16, 2020

Related U.S. Application Data

(60) Provisional application No. 62/698,697, filed on Jul. 16, 2018.

(51) Int. Cl.
| | | |
|---|---|---|
| *B60P 7/15* | (2006.01) | |
| *B60R 9/06* | (2006.01) | |
| *B62D 33/023* | (2006.01) | |
| *B60P 3/40* | (2006.01) | |

(52) U.S. Cl.
CPC ............ *B60P 7/15* (2013.01); *B60R 9/06* (2013.01); *B62D 33/023* (2013.01); *B60P 3/40* (2013.01)

(58) Field of Classification Search
CPC ...... B60P 7/15; B60P 1/00; B60P 3/40; B60P 7/12; B60P 7/0807; B60P 7/0815; B60P 3/035; B60P 3/07; B60P 3/122; B62D 33/046; B62D 21/12; B62D 21/14; B62D 25/2054

USPC ....... 410/143, 151, 144, 150, 152, 87, 7, 44; 296/191, 50, 57.1, 64; 248/354.1, 122.1, 248/125.8, 157, 503, 352
See application file for complete search history.

(56) References Cited

U.S. PATENT DOCUMENTS

| | | | | | |
|---|---|---|---|---|---|
| 2,037,438 | A | * | 4/1936 | Roth | A47L 3/02 |
| | | | | | 182/53 |
| 5,378,095 | A | * | 1/1995 | Shultz | B60P 7/15 |
| | | | | | 410/143 |
| 5,769,580 | A | * | 6/1998 | Purvis | B60P 7/15 |
| | | | | | 410/143 |
| 6,233,877 | B1 | * | 5/2001 | Monroe | A62B 1/04 |
| | | | | | 182/230 |
| 8,202,029 | B2 | * | 6/2012 | Chou | B60P 7/15 |
| | | | | | 410/143 |
| 8,827,299 | B1 | * | 9/2014 | Wiggins, III | B60D 1/36 |
| | | | | | 280/477 |

* cited by examiner

*Primary Examiner* — D Glenn Dayoan
*Assistant Examiner* — Sunsurraye Westbrook
(74) *Attorney, Agent, or Firm* — Christopher A. Proskey; BrownWinick Law Firm

(57) ABSTRACT

Disclosed are various embodiments of a tailgate saver system. In one nonlimiting example embodiment, the tailgate saver includes a crossbar, a pair of supports connected to the crossbar, a tightening mechanism attached to the crossbar, and a strap connected to the tightening mechanism. The crossbar may be configured to extend across a width of a bed of a pickup truck and the pair of supports may be configured to insert into, and be held by, the pickup truck's stake pockets. When the pair of supports are inserted in the stake pockets of the bed of the pickup truck the crossbar prevents elongated objects hauled in the bed of the pickup truck from resting on the tailgate thereby allowing the tailgate to be opened and closed.

25 Claims, 37 Drawing Sheets

FIG. 38
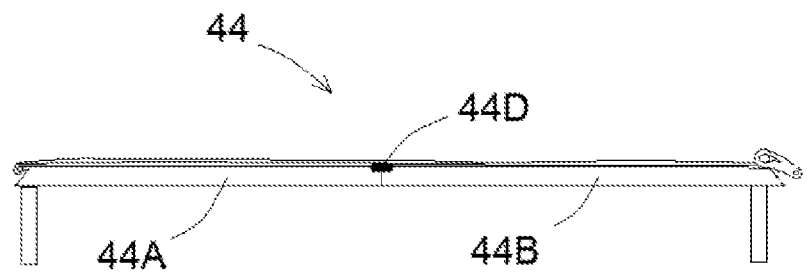
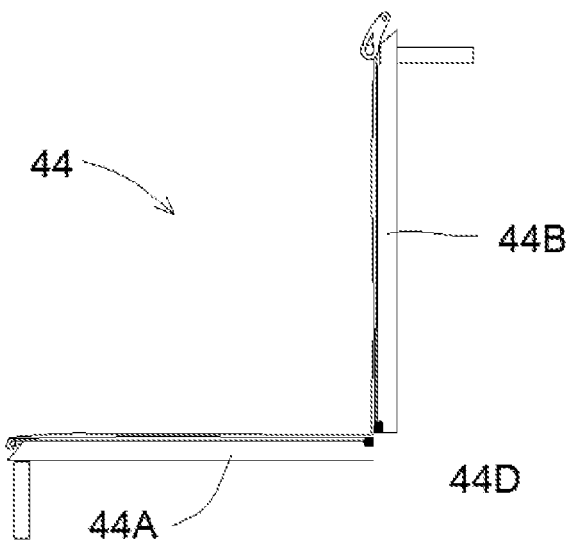
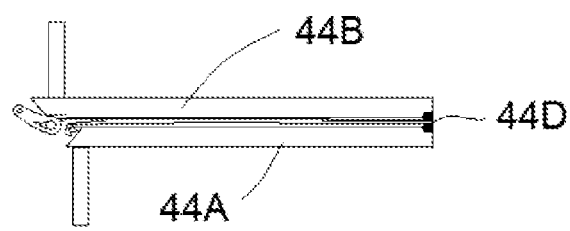

TAILGATE SAVER SYSTEM AND METHOD

CROSS REFERENCE TO RELATED APPLICATIONS

This application claims the benefit of U.S. Patent Application No. 62/698,697 which was filed with the USPTO on Jul. 16, 2018, the entire contents of which are incorporated herein by reference.

FIELD OF THE DISCLOSURE

This disclosure relates generally to vehicle accessories. More specifically and without limitation, this disclosure relates to vehicle accessories for use in pickup beds.

BACKGROUND OF THE DISCLOSURE

Pickup trucks are old and well known in the art. Pickup trucks are notable for having a bed and a tailgate that are well suited for hauling large items. Pickup truck owners are faced with challenges when hauling elongated items that are longer than the bed, such as boards, pipes, trim, ladders and the like. When hauling items that are longer than the bed, the user must choose one of two relatively undesirable options.

One option is to lower the tailgate and let the elongated items lay flat across the bed and the tailgate. While functional, this option is undesirable in that items can easily slide out and/or fall out of the bed, especially when the pickup truck accelerates, drives up hill and/or hits bumps in the road.

Another option is to leave the tailgate in a raised position and let the elongated items rest on the top of the tailgate. This option allows the use to store other items in the bed without fear of them falling or sliding out of the bed. However, this option makes it essentially impossible to open and close the tailgate once the elongated items are placed in the bed (because they rest on the tailgate). This limits the usability of the bed and makes it difficult to insert and remove other items from the bed. In addition, resting elongated items on the tailgate can damage the tailgate.

Regardless of which of the two undesirable options a user chooses, when hauling elongated items in the bed of a pickup truck there is no quick, easy, efficient and effective way of securing the elongated items. While a user can use ropes or bungee cords or some other manner of tie-down, there simply is no good way of tying down elongated items hauled in a pickup truck bed that is quick, easy, efficient and securely holds the elongated items.

Therefore, for all the reasons stated above, and the reasons stated below, there is a need in the art for a tailgate saver system and method that improves upon the state of the art.

Another object of the disclosure is to provide a tailgate saver system and method that prevents elongated items from resting on the tailgate of a pickup truck.

Yet another object of the disclosure is to provide a tailgate saver system and method that facilitates the opening and closing of a tailgate when hauling elongated items.

Another object of the disclosure is to provide a tailgate saver system and method that helps to prevent items from falling out of the bed of a pickup truck.

Yet another object of the disclosure is to provide a tailgate saver system and method that helps to prevent items from sliding out of the bed of a pickup truck.

Another object of the disclosure is to provide a tailgate saver system and method that makes it easier to haul items in the bed of a pickup truck.

Yet another object of the disclosure is to provide a tailgate saver system and method that protects the tailgate of a pickup truck.

Another object of the disclosure is to provide a tailgate saver system and method that makes it easier to secure elongated items in the bed of a pickup truck.

Yet another object of the disclosure is to provide a tailgate saver system and method that is adjustable for use in various pickup trucks.

Another object of the disclosure is to provide a tailgate saver system and method that improves safety.

Yet another object of the disclosure is to provide a tailgate saver system and method that is safe to use.

Another object of the disclosure is to provide a tailgate saver system and method that is easy to use.

Yet another object of the disclosure is to provide a tailgate saver system and method that compacts for storage.

Another object of the disclosure is to provide a tailgate saver system and method that is strong.

Yet another object of the disclosure is to provide a tailgate saver system and method that is easy to install.

Another object of the disclosure is to provide a tailgate saver system and method that is easy to remove.

Yet another object of the disclosure is to provide a tailgate saver system and method that provides a convenient way of securing elongated items in the bed of the pickup truck.

Another object of the disclosure is to provide a tailgate saver system and method that improves efficiencies.

Yet another object of the disclosure is to provide a tailgate saver system and method that improves the functionality of a pickup truck.

Another object of the disclosure is to provide a tailgate saver system and method that has a low profile.

Yet another object of the disclosure is to provide a tailgate saver system and method that has many uses.

Another object of the disclosure is to provide a tailgate saver system and method that does not interfere with covers over the bed.

These and other objects, features, or advantages of the disclosure will become apparent from the specification, figures and claims.

BRIEF DESCRIPTION OF THE DRAWINGS

FIG. 38 represents an example of a tailgate saver configuration where the crossbar includes a hinge allowing the crossbar to fold.

SUMMARY OF THE DISCLOSURE

Figure 1:
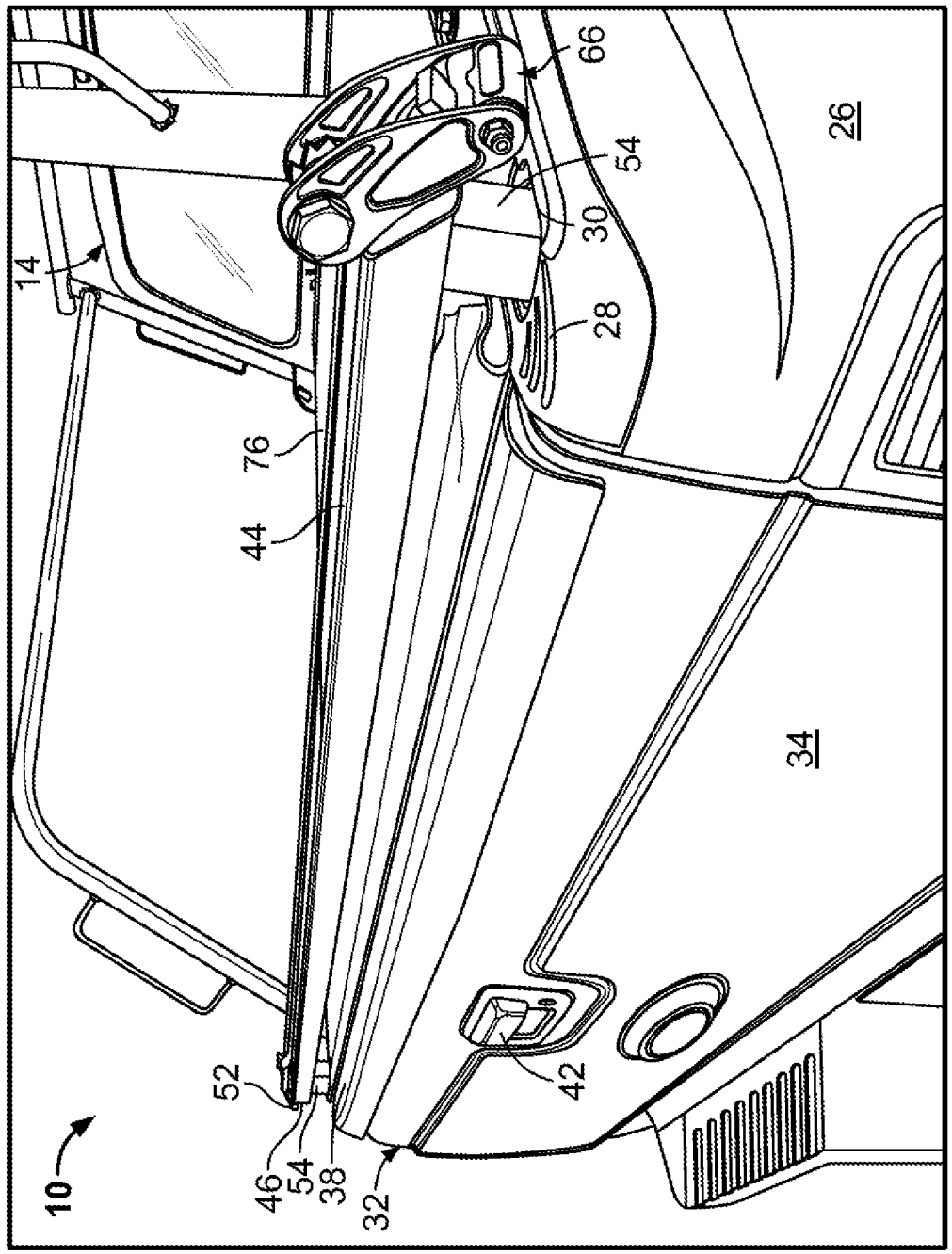
FIG. 1 is a perspective view of an end of a vehicle having a tailgate and a tailgate saver system.
Figure 2:
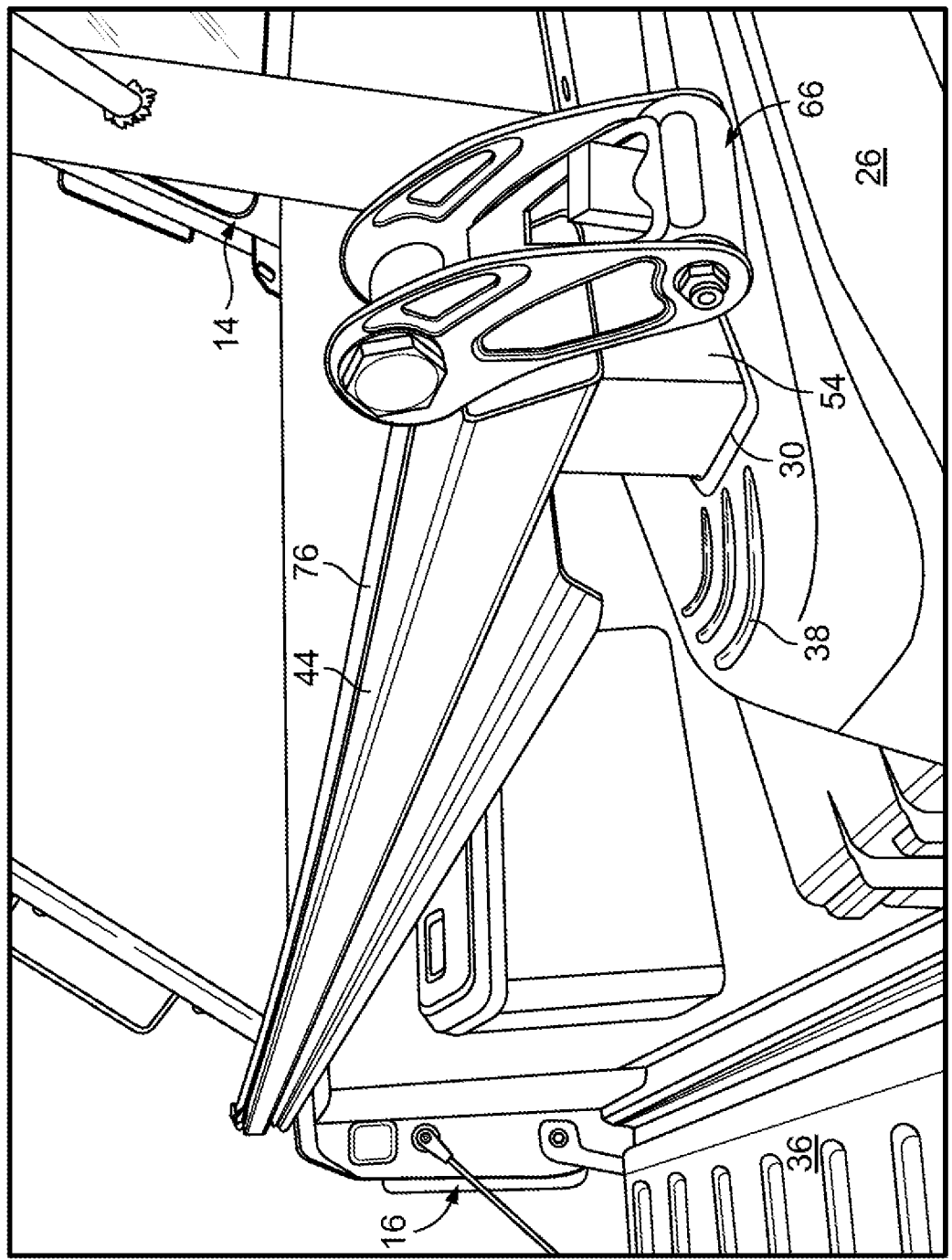
FIG. 2 is another perspective view of the end of the vehicle having the tailgate saver where the tailgate is in a downward position.
Figure 3:
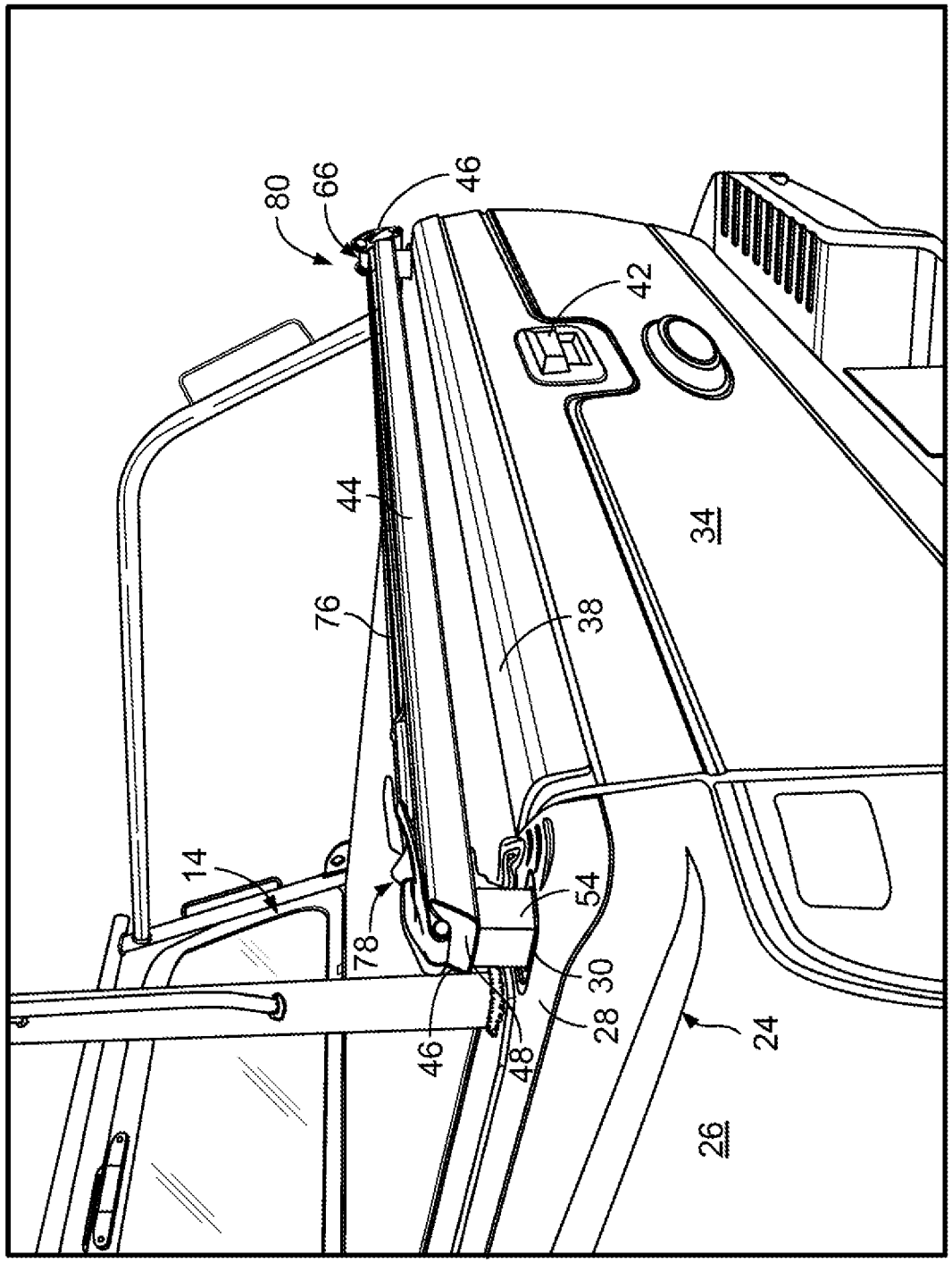
FIG. 3 is another perspective view of the end of the vehicle having the tailgate and a tailgate saver system.
Figure 4:
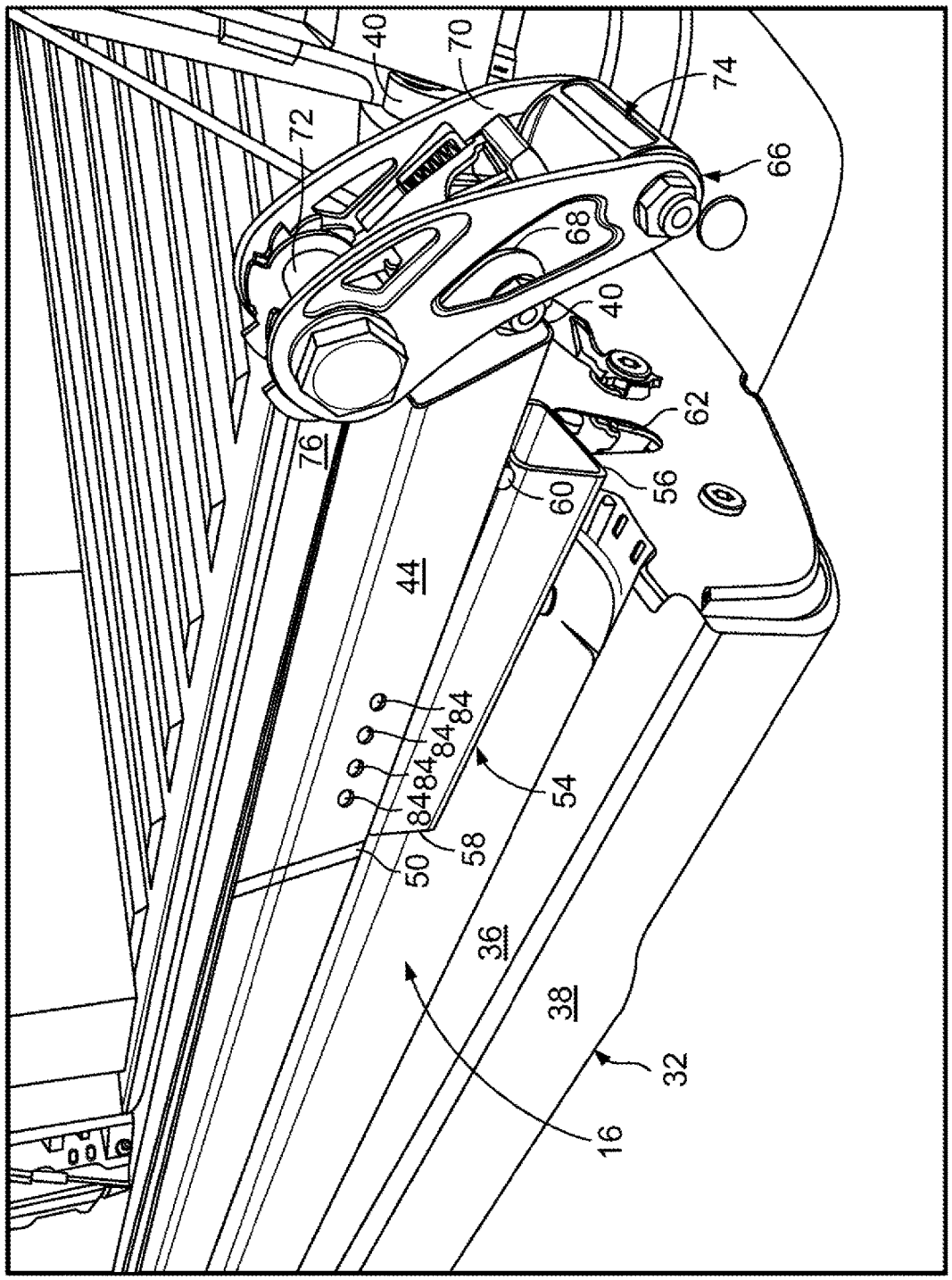
FIG. 4 is a close-up perspective view of an end of a tailgate saver system in a folded position.
Figure 5:
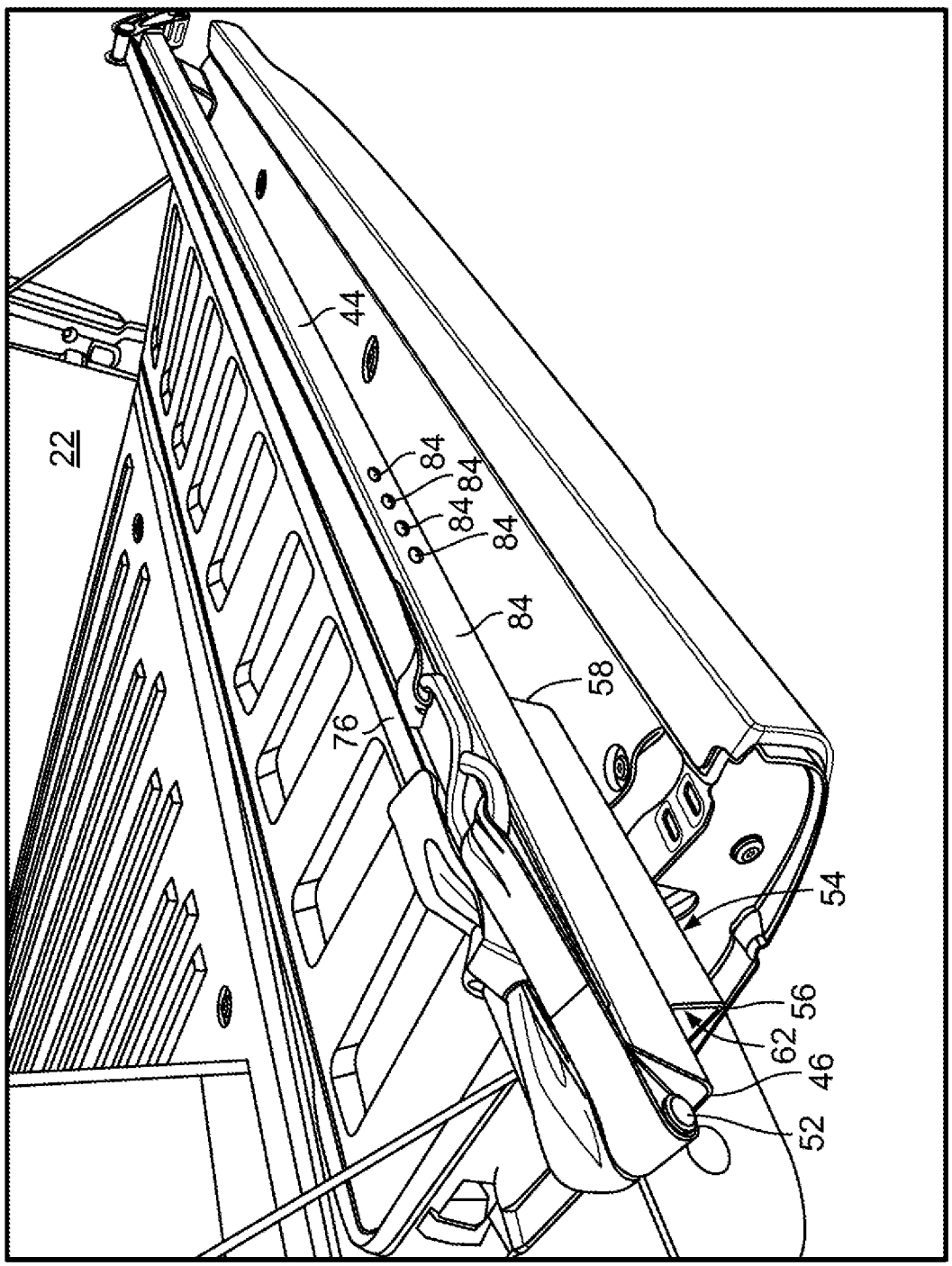
FIG. 5 is another close-up perspective view of another end of the tailgate saver system in a folded position.
Figure 6:
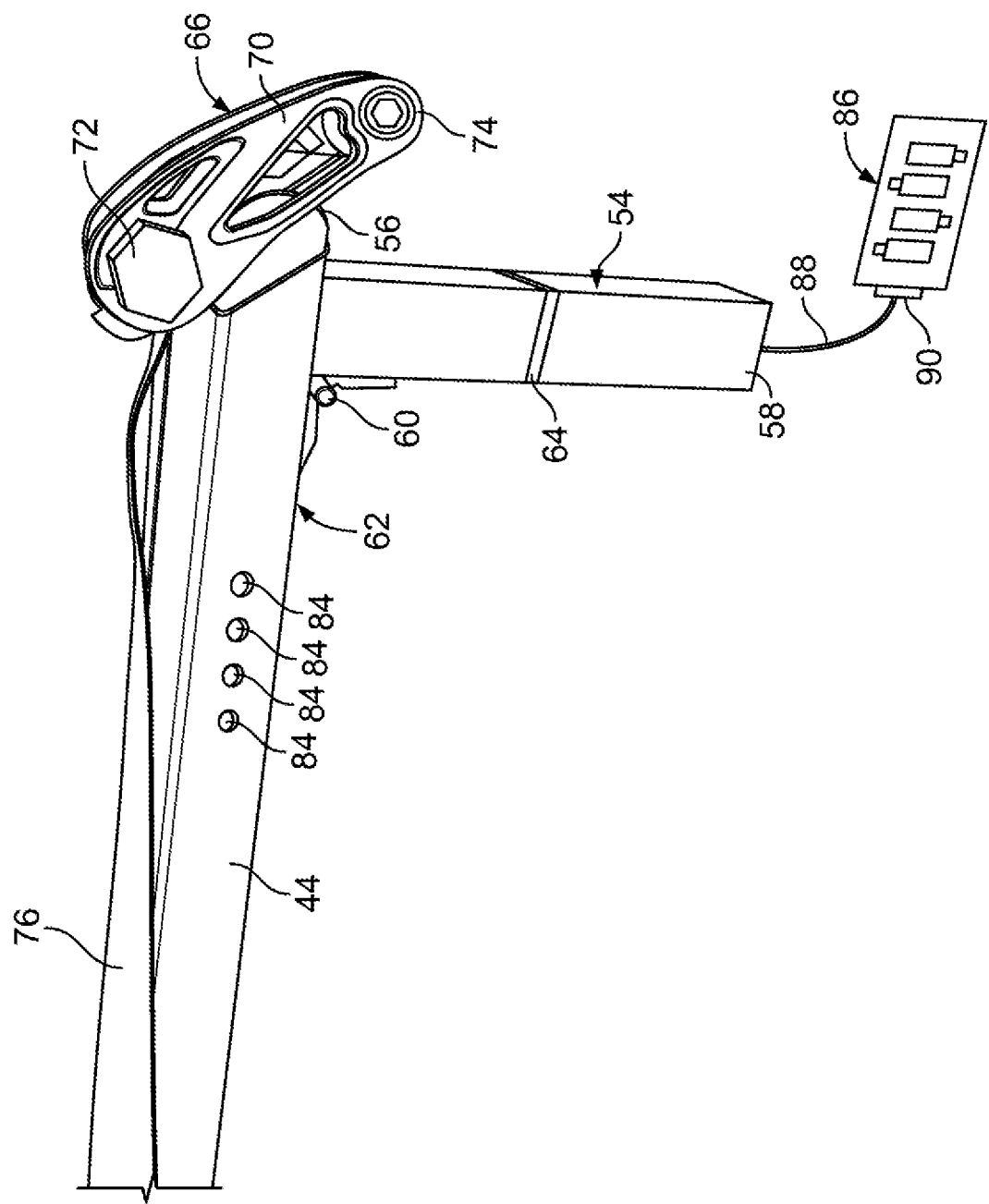
FIG. 6 is a close-up perspective view of an end of a tailgate saver system in an unfolded position.
Figure 7:
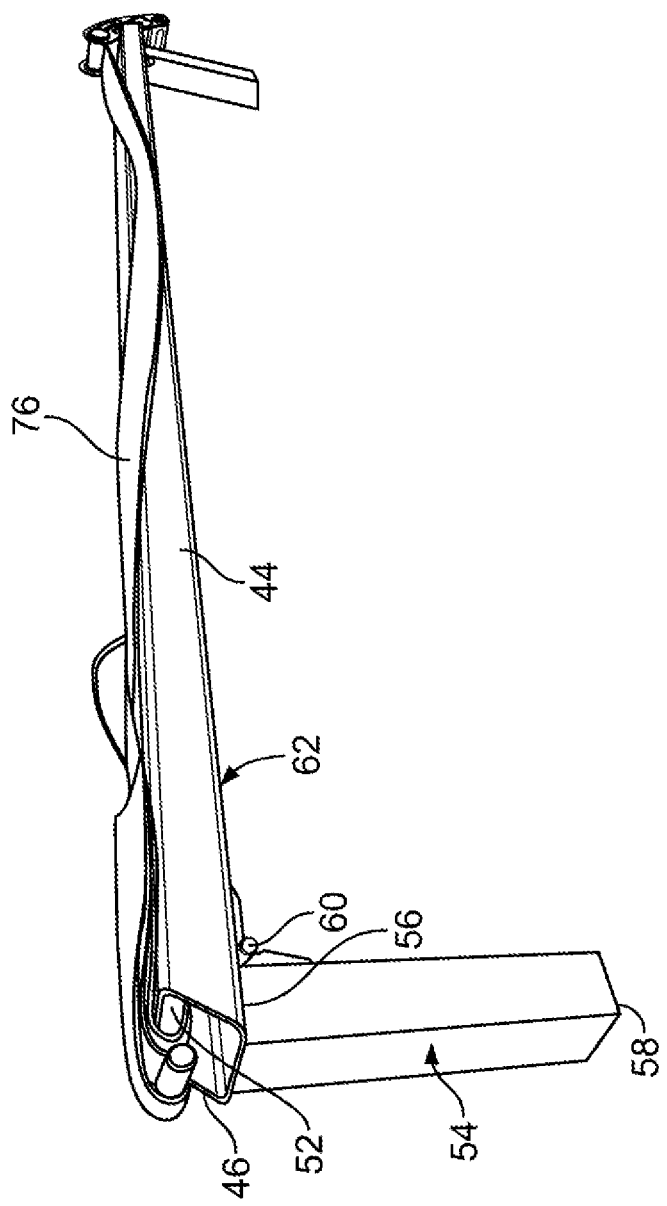
FIG. 7 is a close-up perspective view of another end of a tailgate saver system in the unfolded position.
Figure 8:
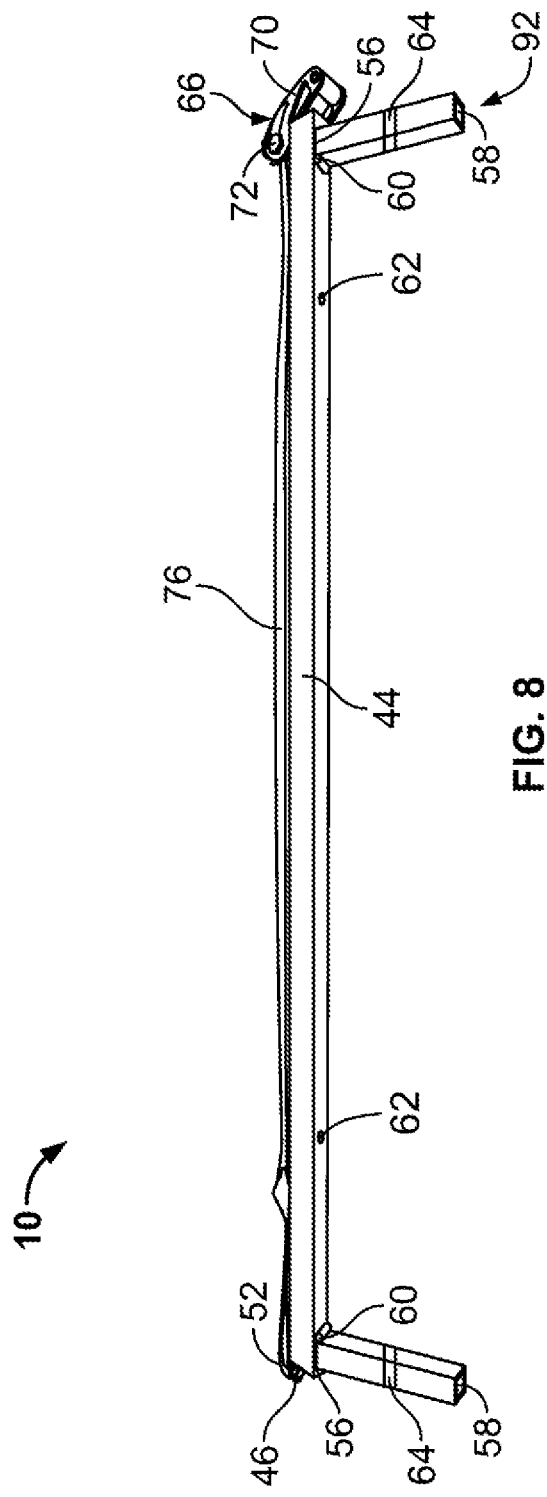
FIG. 8 is a view of the tailgate saver system in an unfolded position.
Figure 9:
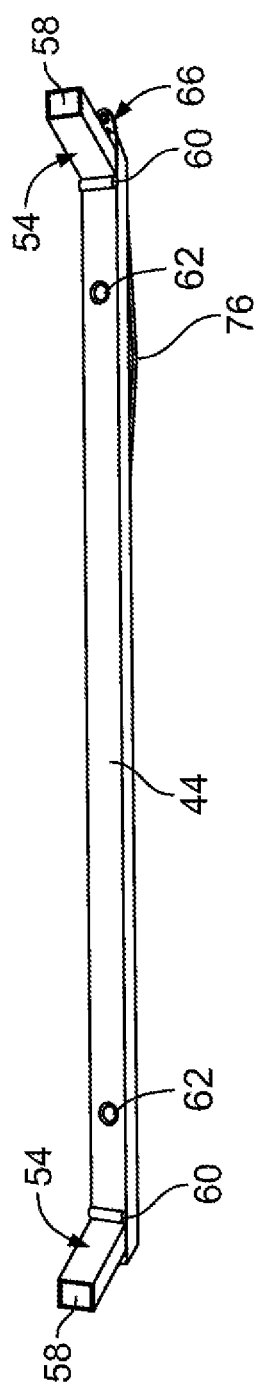
FIG. 9 is another view of the tailgate saver system in an unfolded position.
Figure 10:
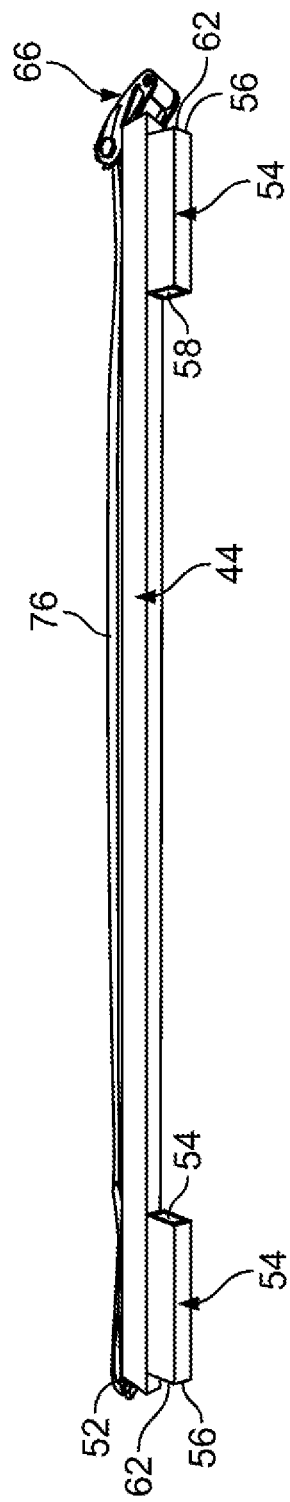
FIG. 10 is a view of the tailgate saver system in a folded position.
Figure 11:
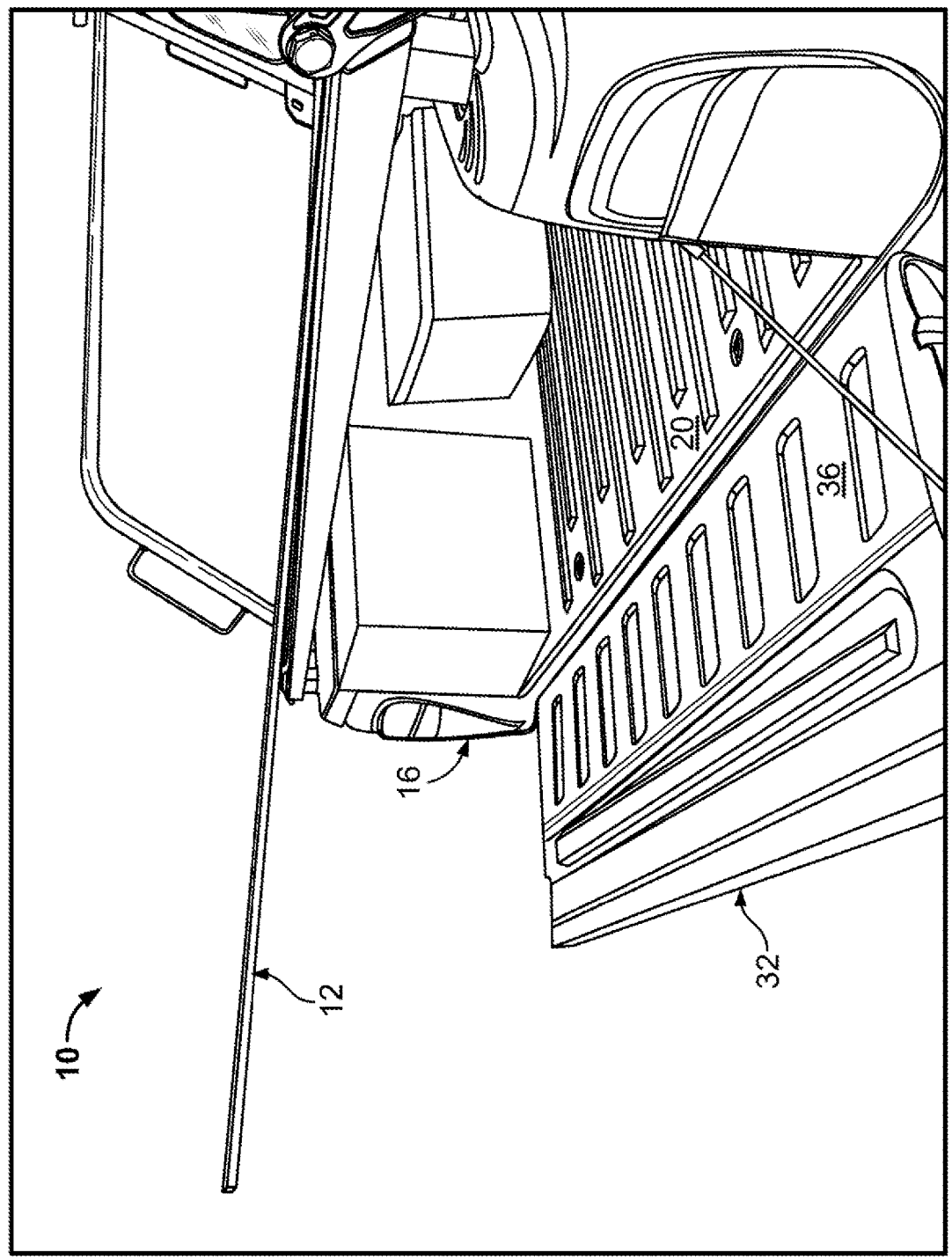
FIG. 11 is a perspective view of the tailgate saver system on an end of a vehicle with objects thereon.
Figure 12:
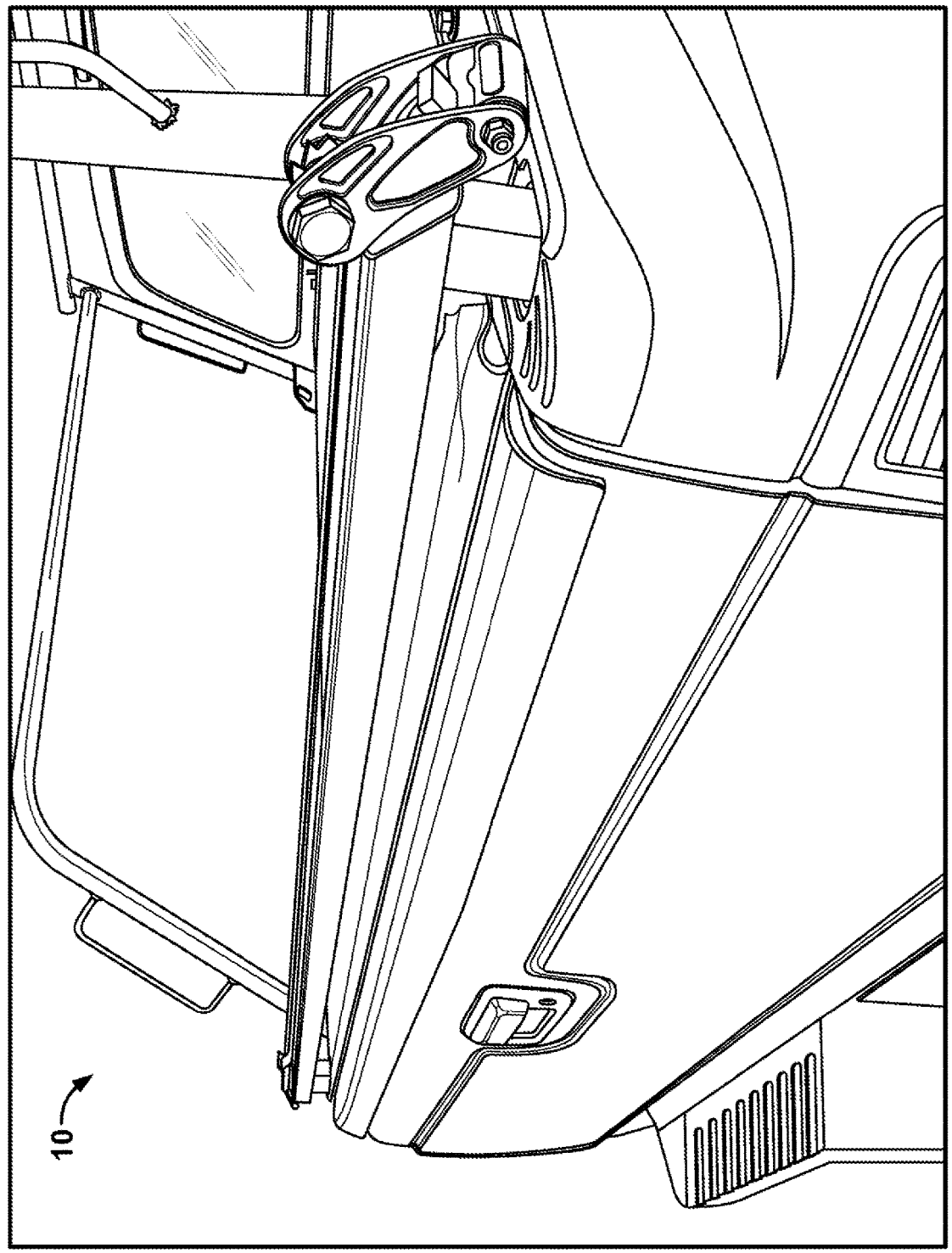
FIG. 12 is another perspective view of the tailgate saver system on an end of a vehicle with objects thereon.
Figure 13:
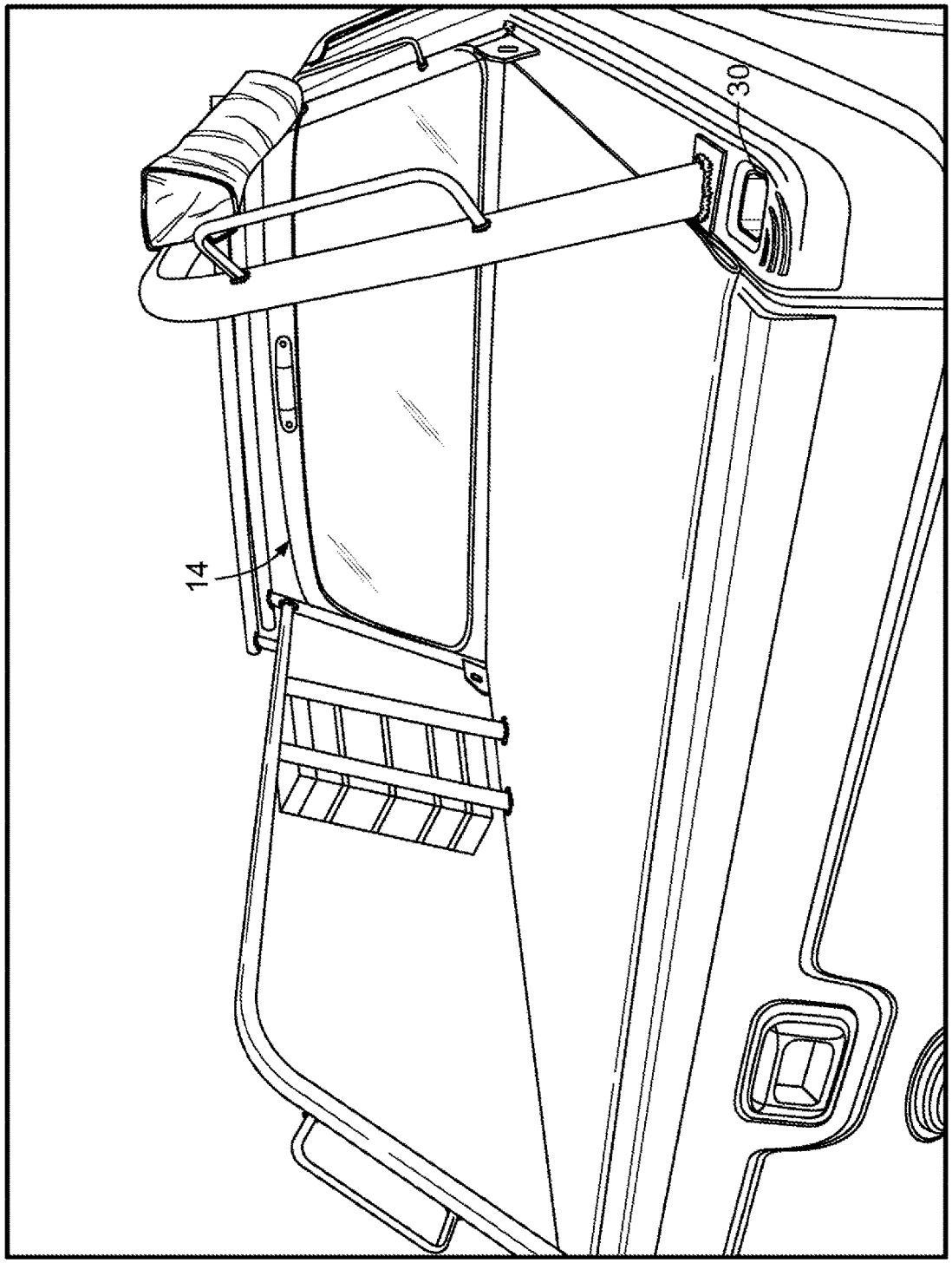
FIG. 13 is an end view of a vehicle having a bed and stake pockets.
Figure 14:
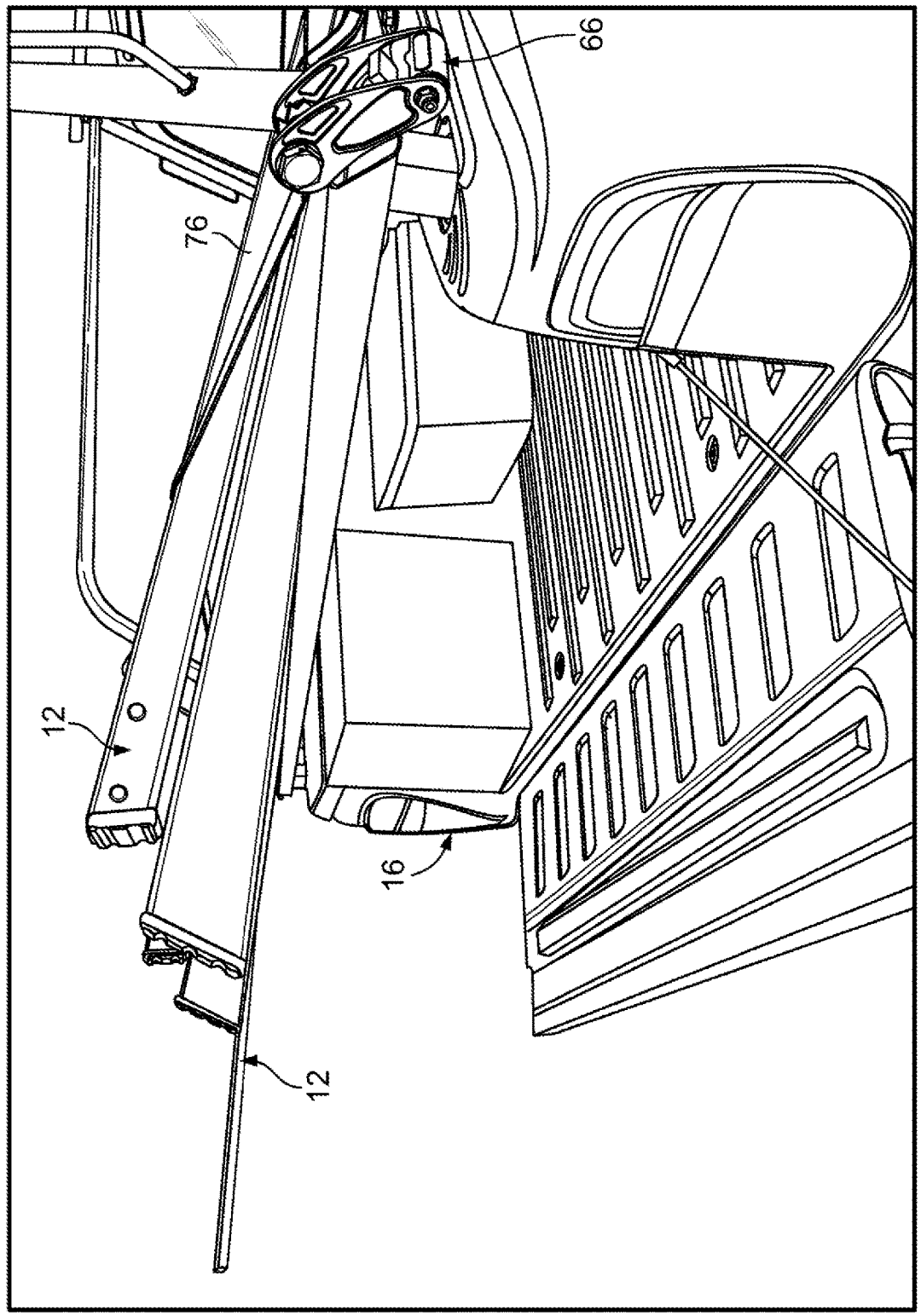
FIG. 14 is a perspective view of the tailgate saver system on an end of a vehicle with objects thereon, wherein a tailgate is in an open position.
Figure 15:
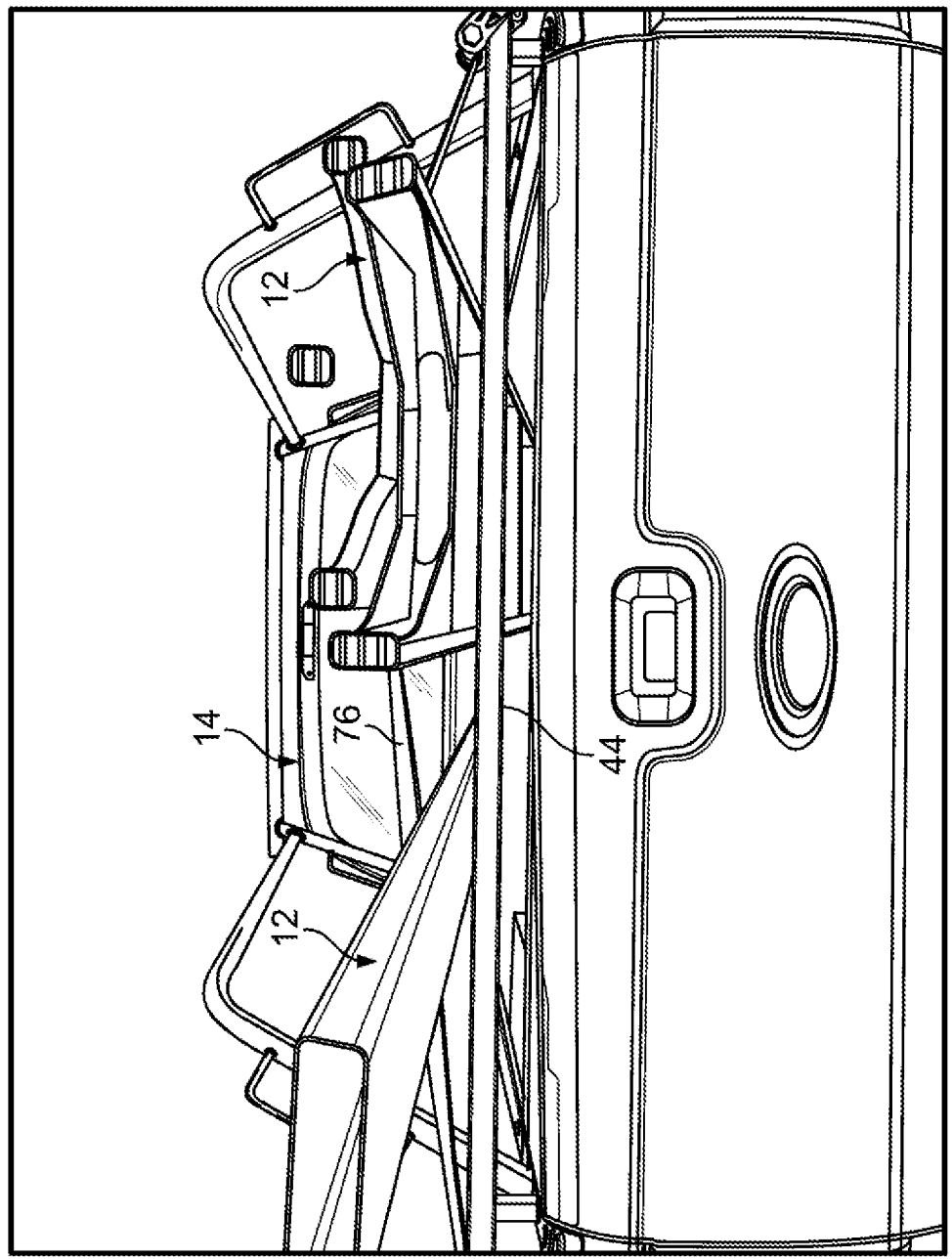
FIG. 15 is an end view of a vehicle with elongated items restrained by a tailgate saver.
Figure 16:
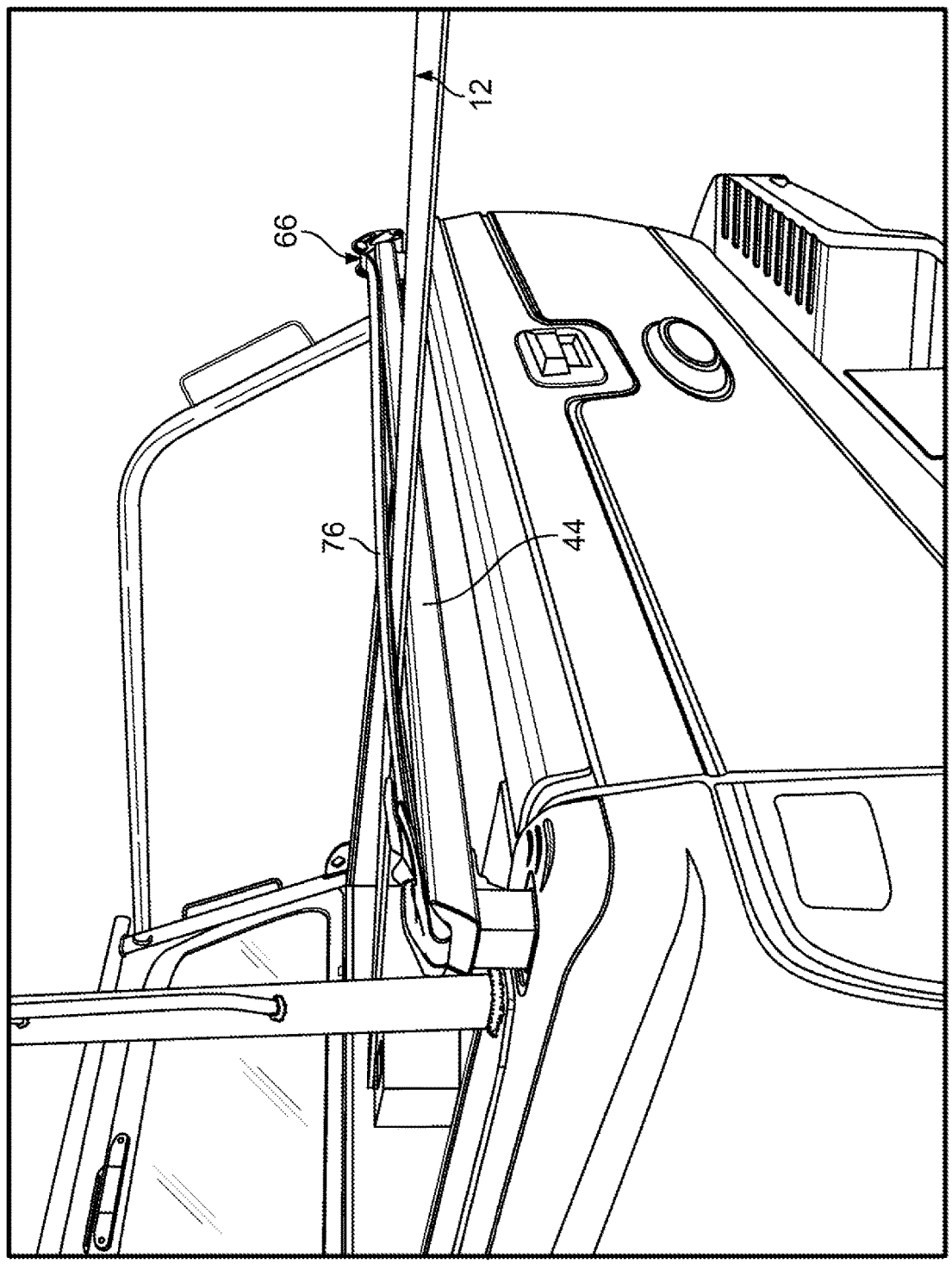
FIG. 16 is a perspective view of the end view of the vehicle with elongated items restrained by a tailgate saver.
Figure 17:
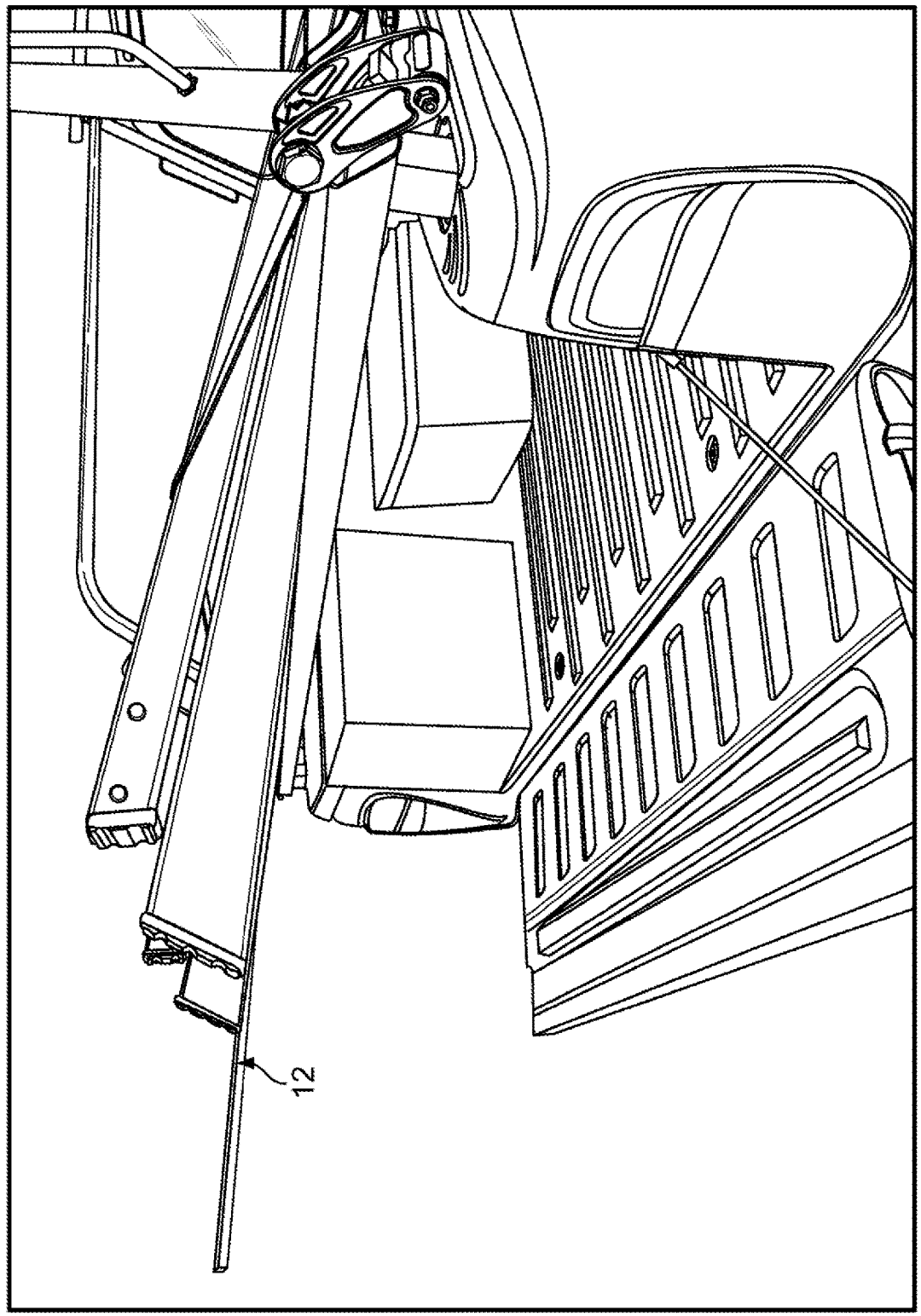
FIG. 17 is a perspective view of the end view of the vehicle with elongated items restrained by a tailgate saver with a tailgate in a lowered position.
Figure 18:
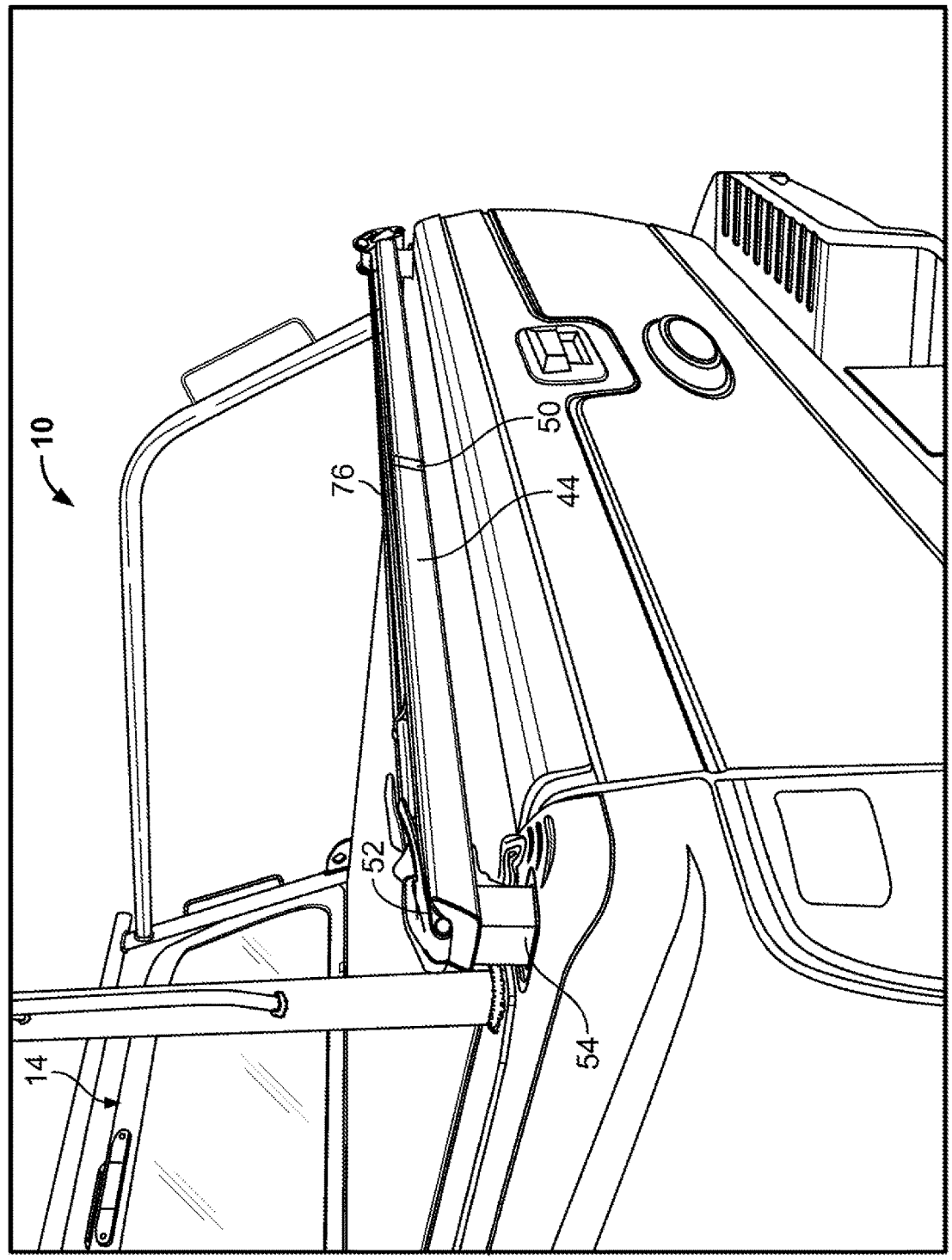
FIG. 18 is a perspective view of the end view of the vehicle with a tailgate saver.
Figure 19:
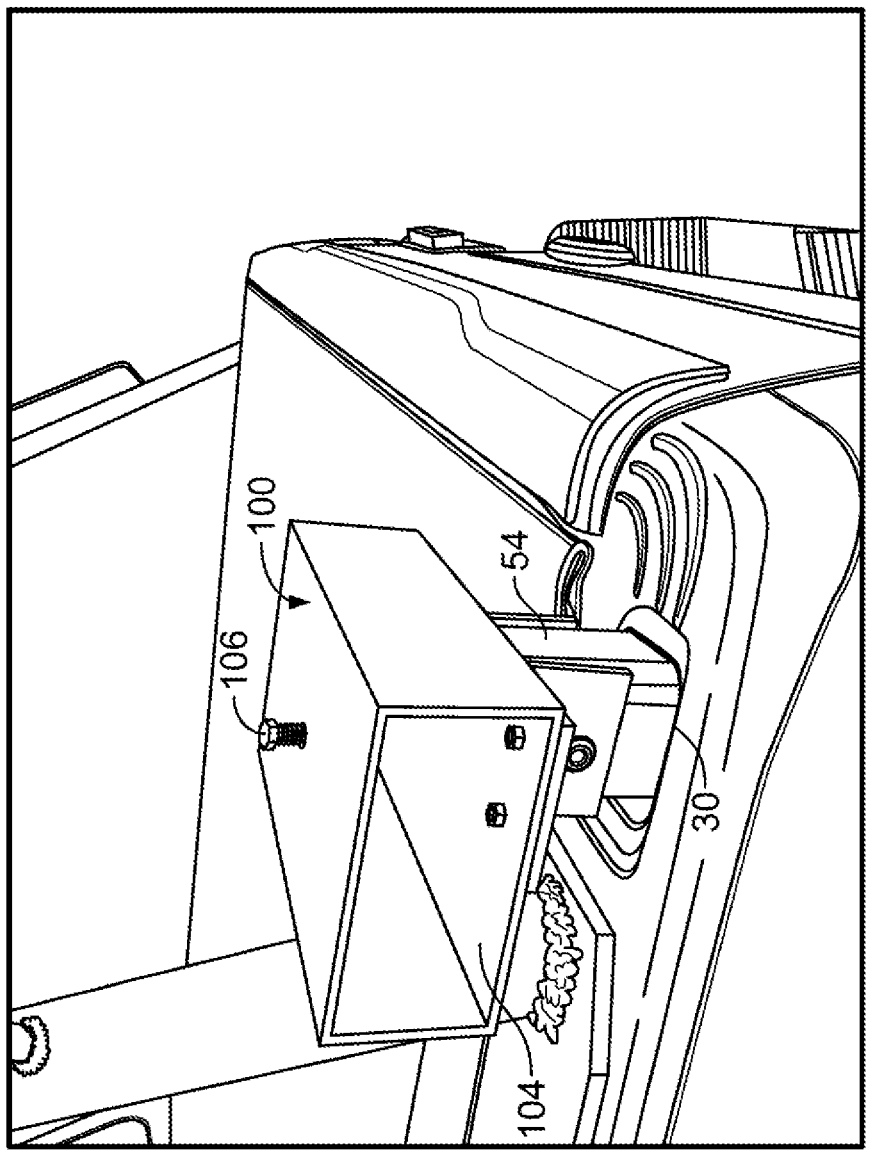
FIG. 19 is a perspective view of a tailgate saver inserted into a stake pocket of a vehicle.
Figure 20:
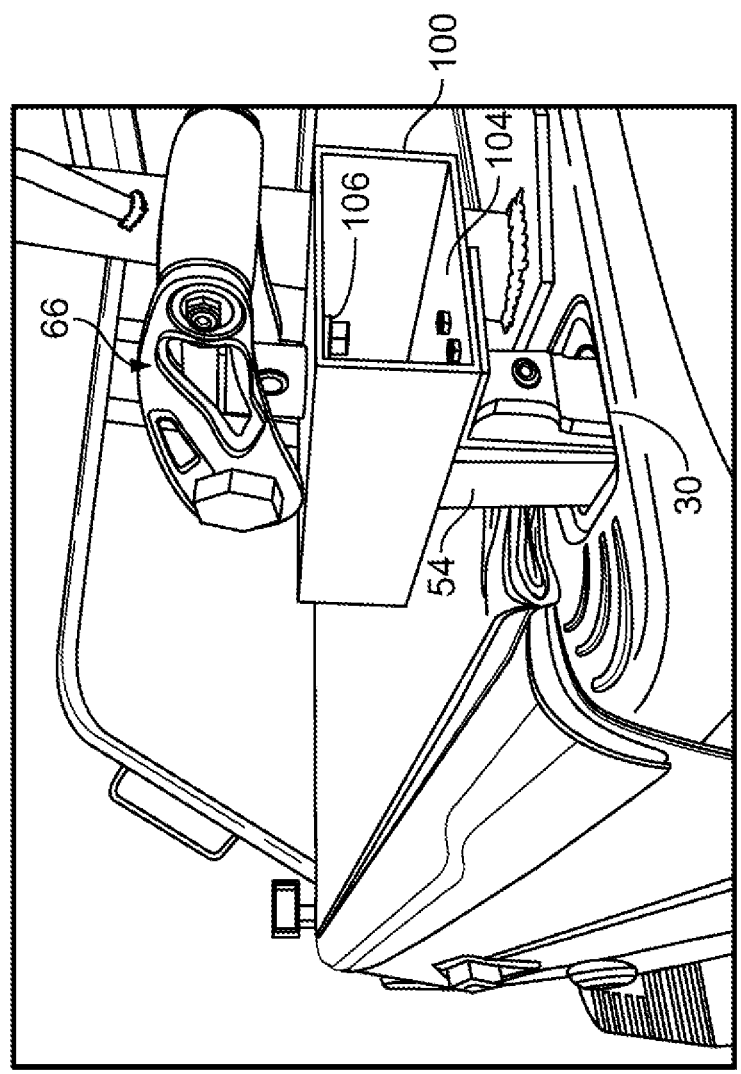
FIG. 20 is a perspective view of a tailgate saver inserted into a stake pocket of a vehicle wherein the tailgate saver includes a tightening mechanism.
Figure 21:
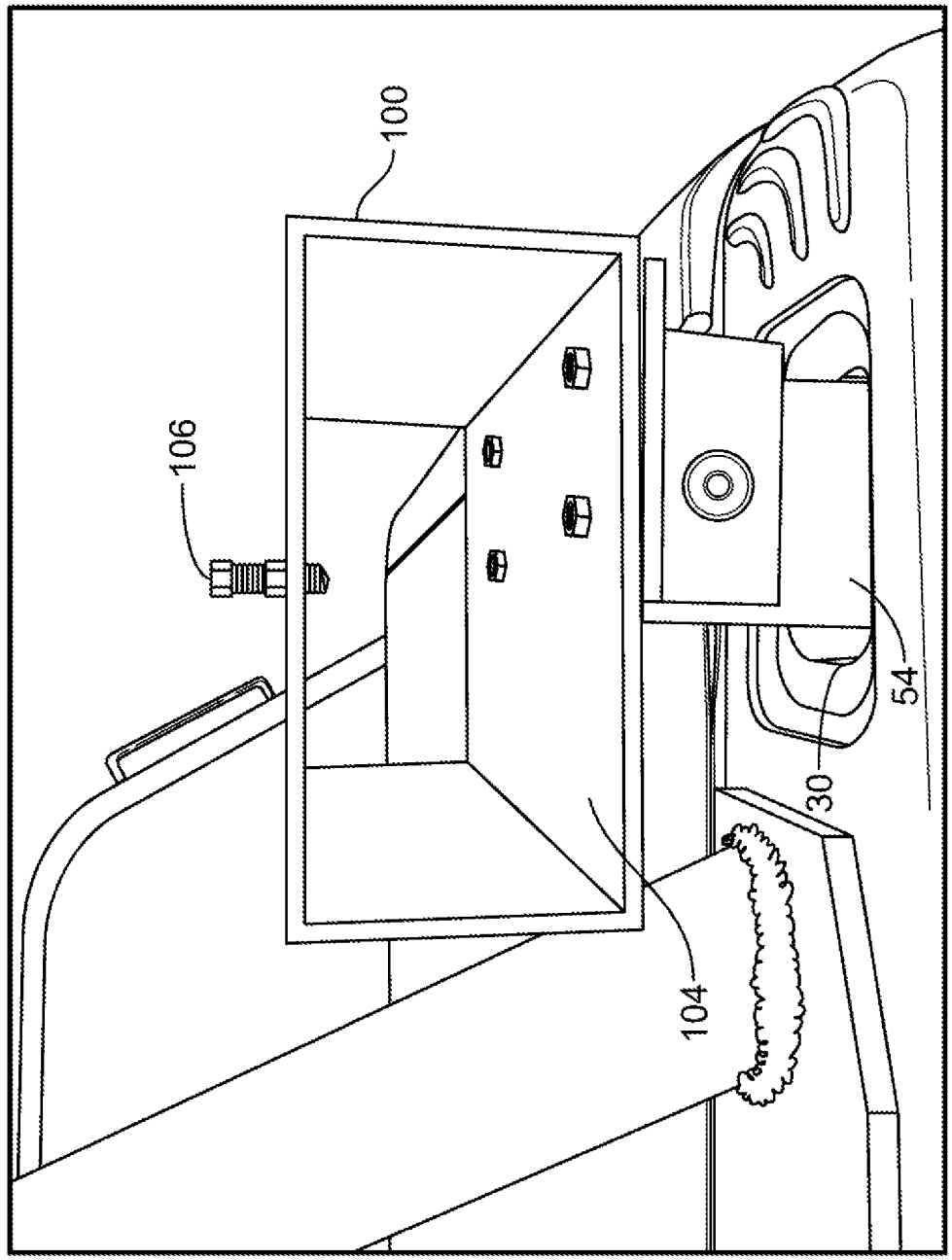
FIG. 21 is an end view of a tailgate saver inserted into a stake pocket of a vehicle wherein the tailgate saver includes a locking member.
Figure 22:
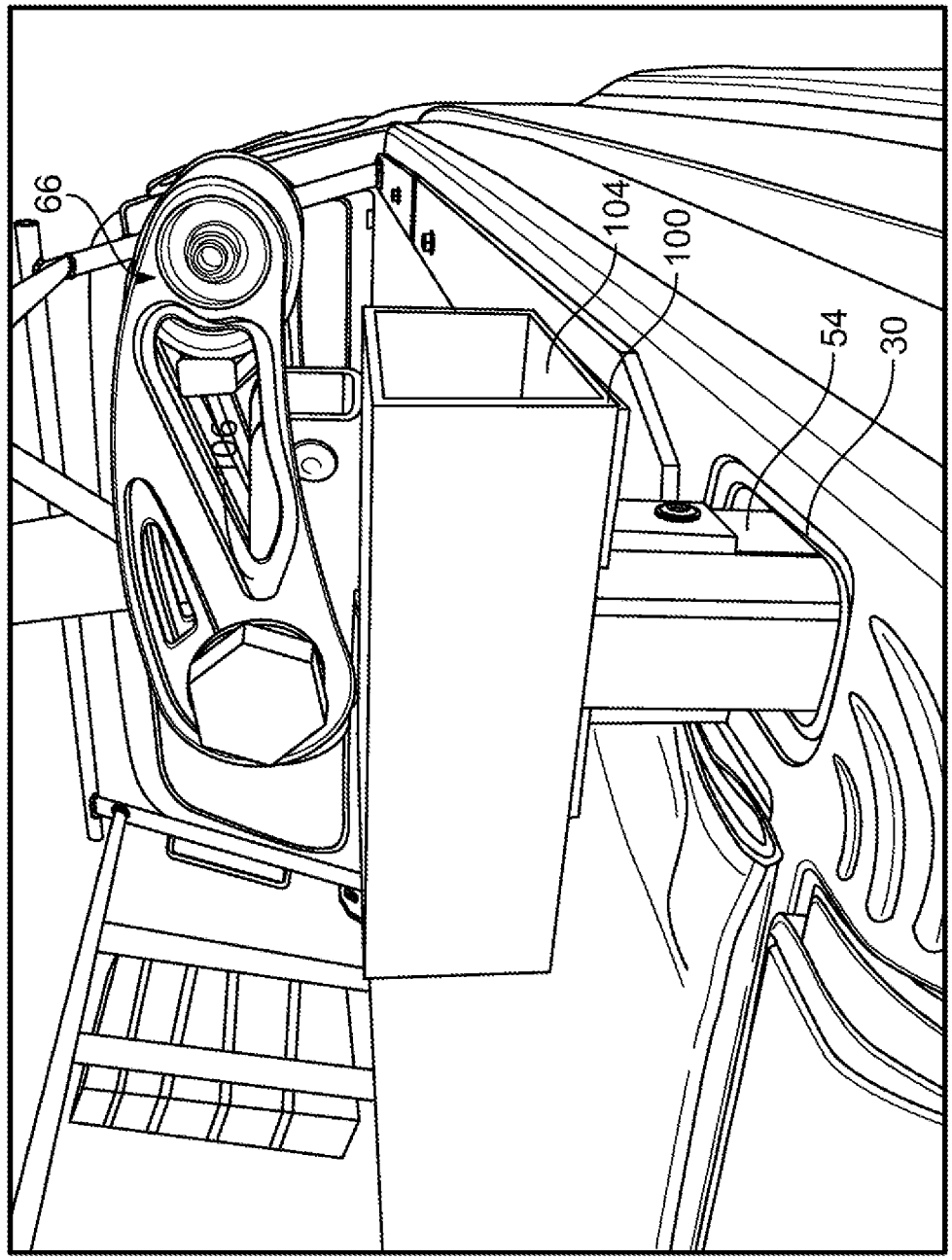
FIG. 22 is a perspective view of a tailgate saver inserted into a stake pocket of a vehicle wherein the tailgate saver includes a tightening mechanism.
Figure 23:
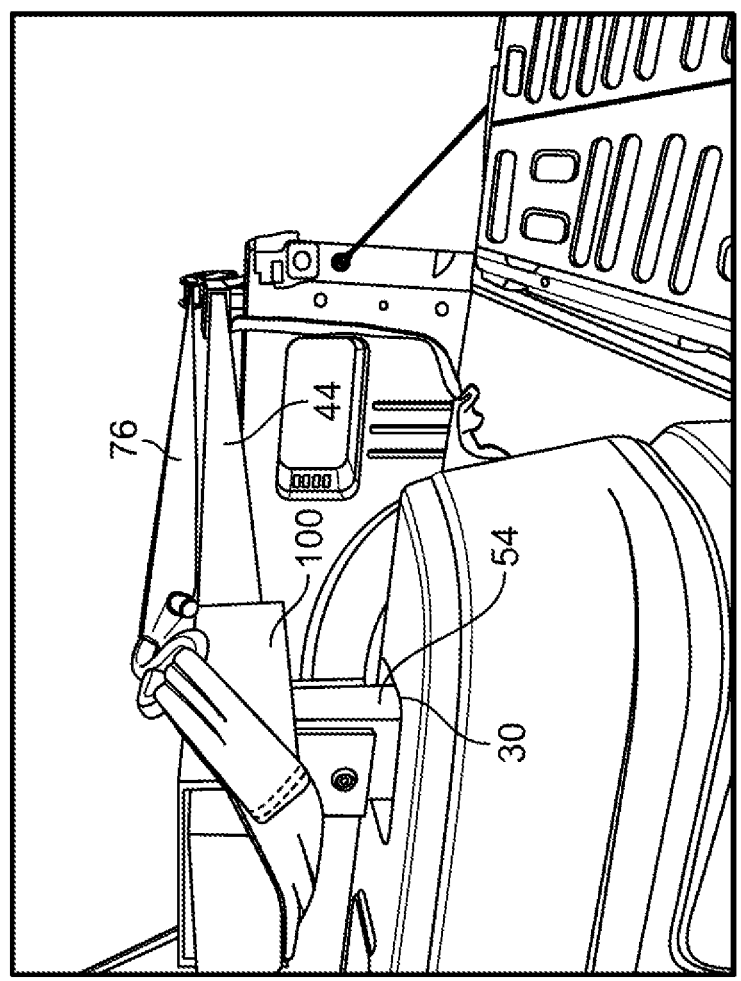
FIG. 23 is a perspective view of a tailgate saver inserted into stake pockets of a vehicle wherein the tailgate saver includes a crossbar which may be made of wood.
Figure 24:
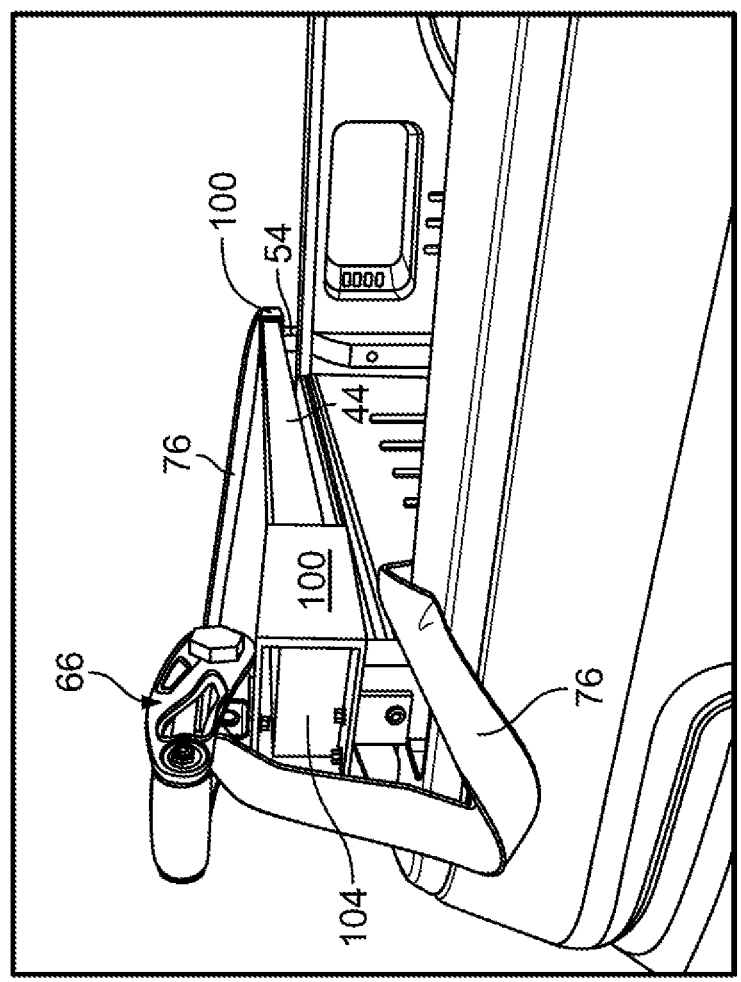
FIG. 24 is a first perspective view of a tailgate saver inserted into stake pockets of a vehicle wherein the tailgate saver includes a crossbar which may be made of wood.
Figure 25:
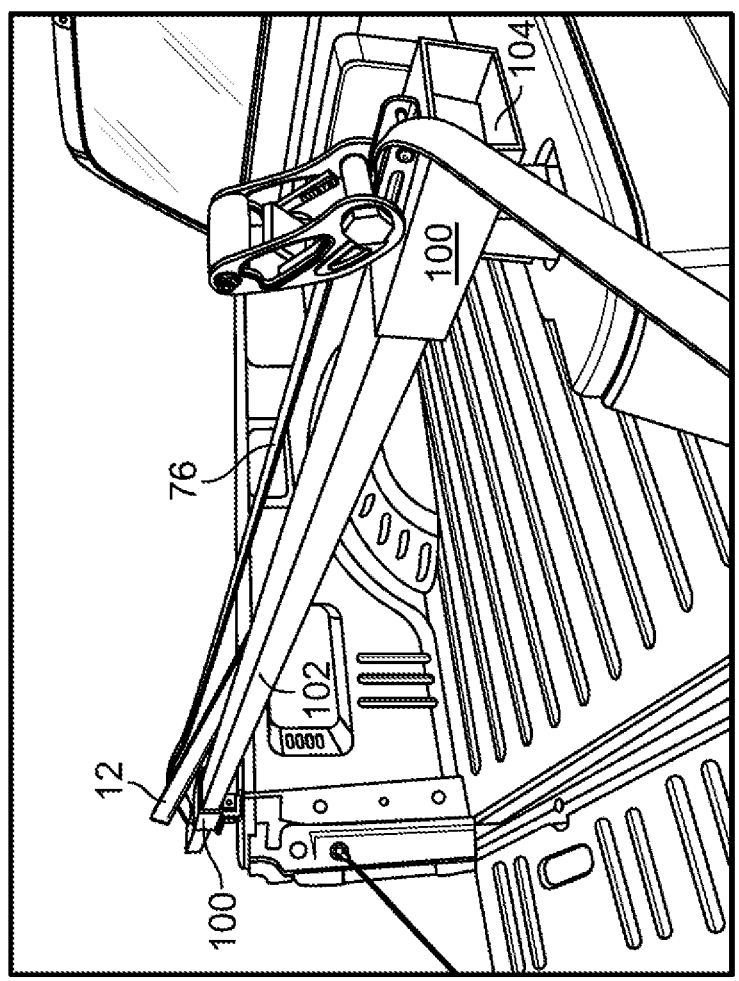
FIG. 25 is a second perspective view of a tailgate saver inserted into stake pockets of a vehicle wherein the tailgate saver includes a crossbar which may be made of wood.
Figure 26:
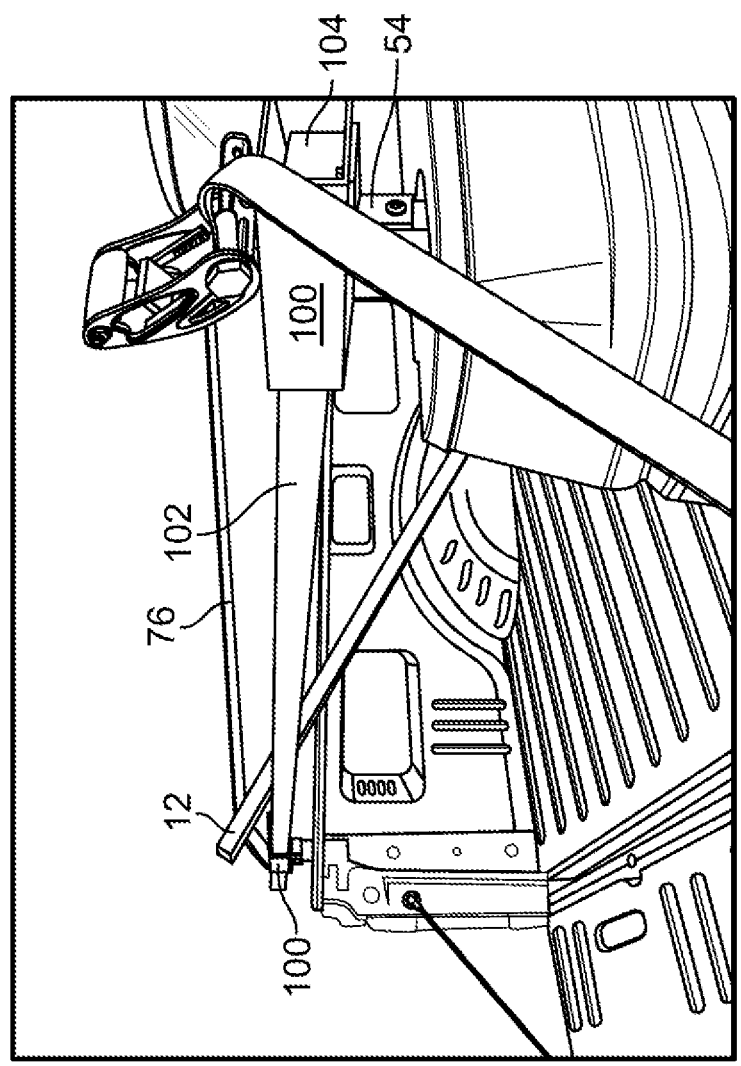
FIG. 26 is a third perspective view of a tailgate saver inserted into stake pockets of a vehicle wherein the tailgate saver includes a crossbar which may be made of wood.
Figure 27:
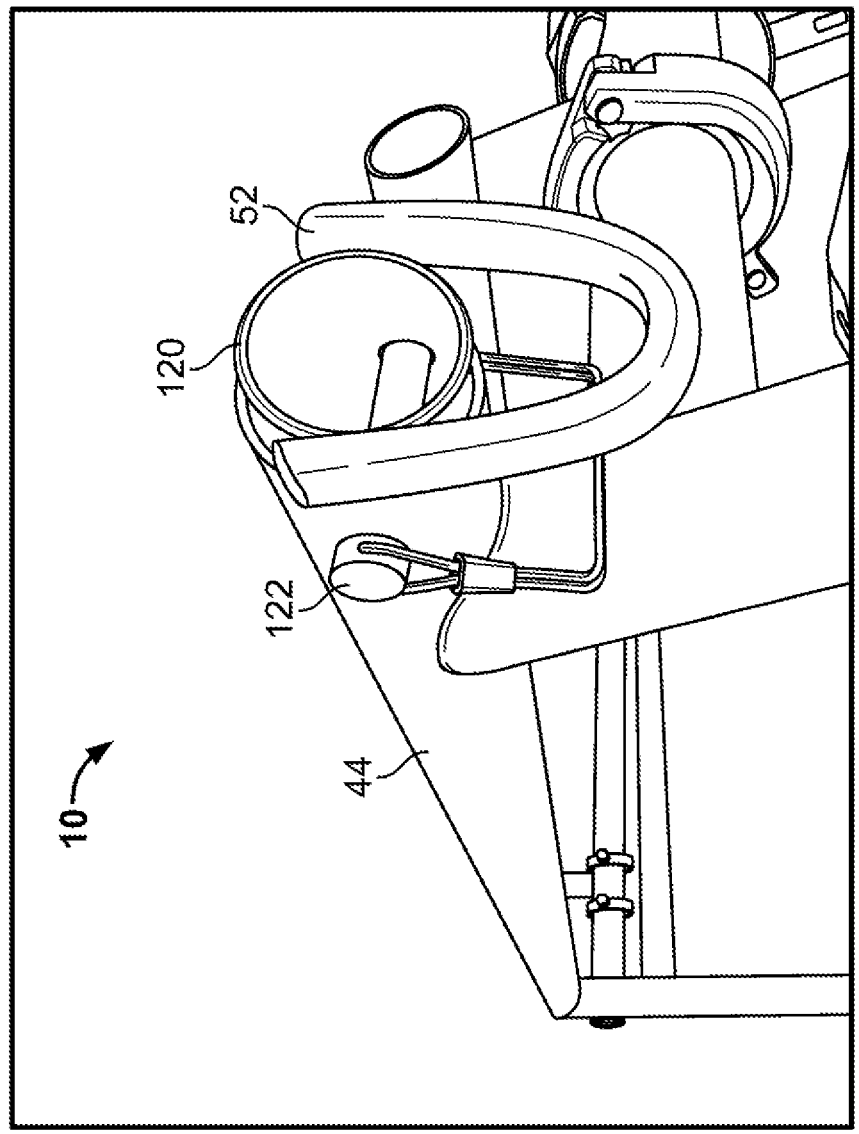
FIG. 27 is a perspective view of a tailgate saver having a crossbar with a circular cross-section.
Figure 28:
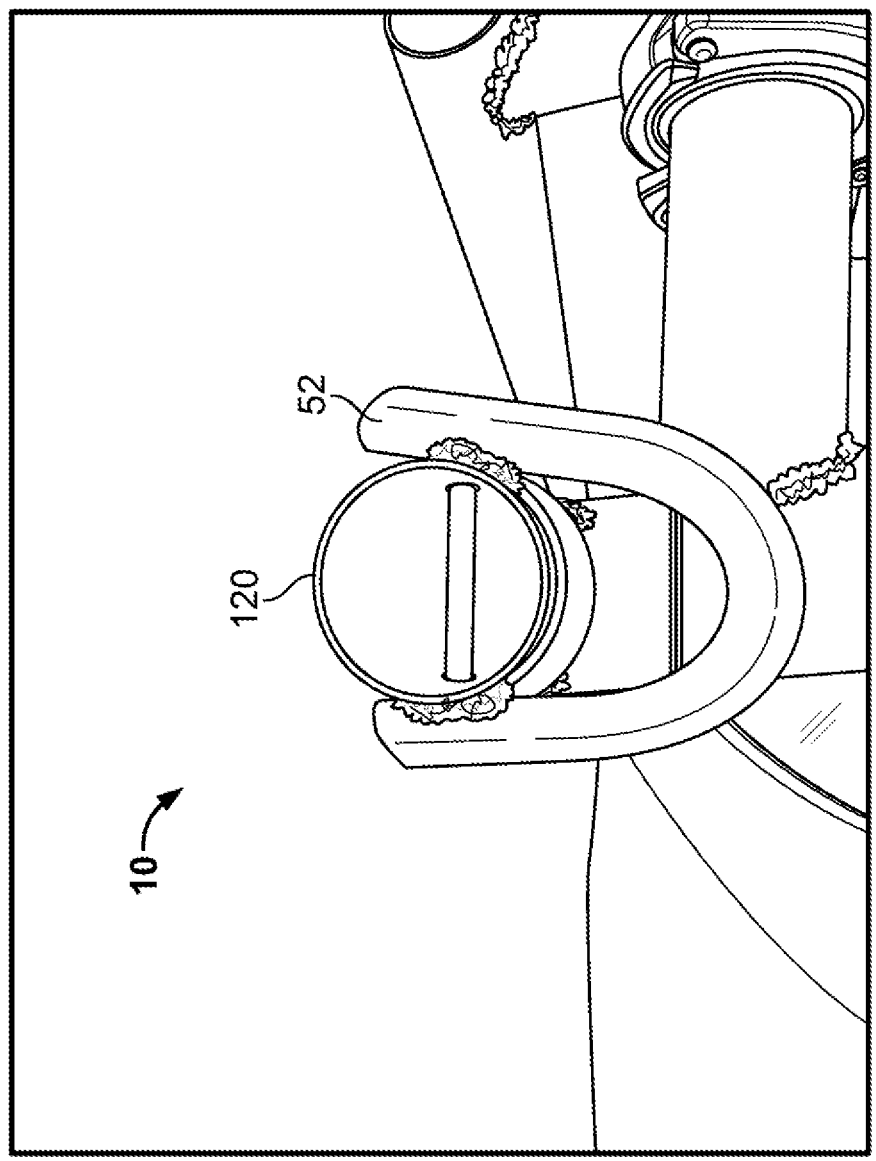
FIG. 28 is an end view of a tailgate saver having a crossbar with a circular cross-section.
Figure 29:
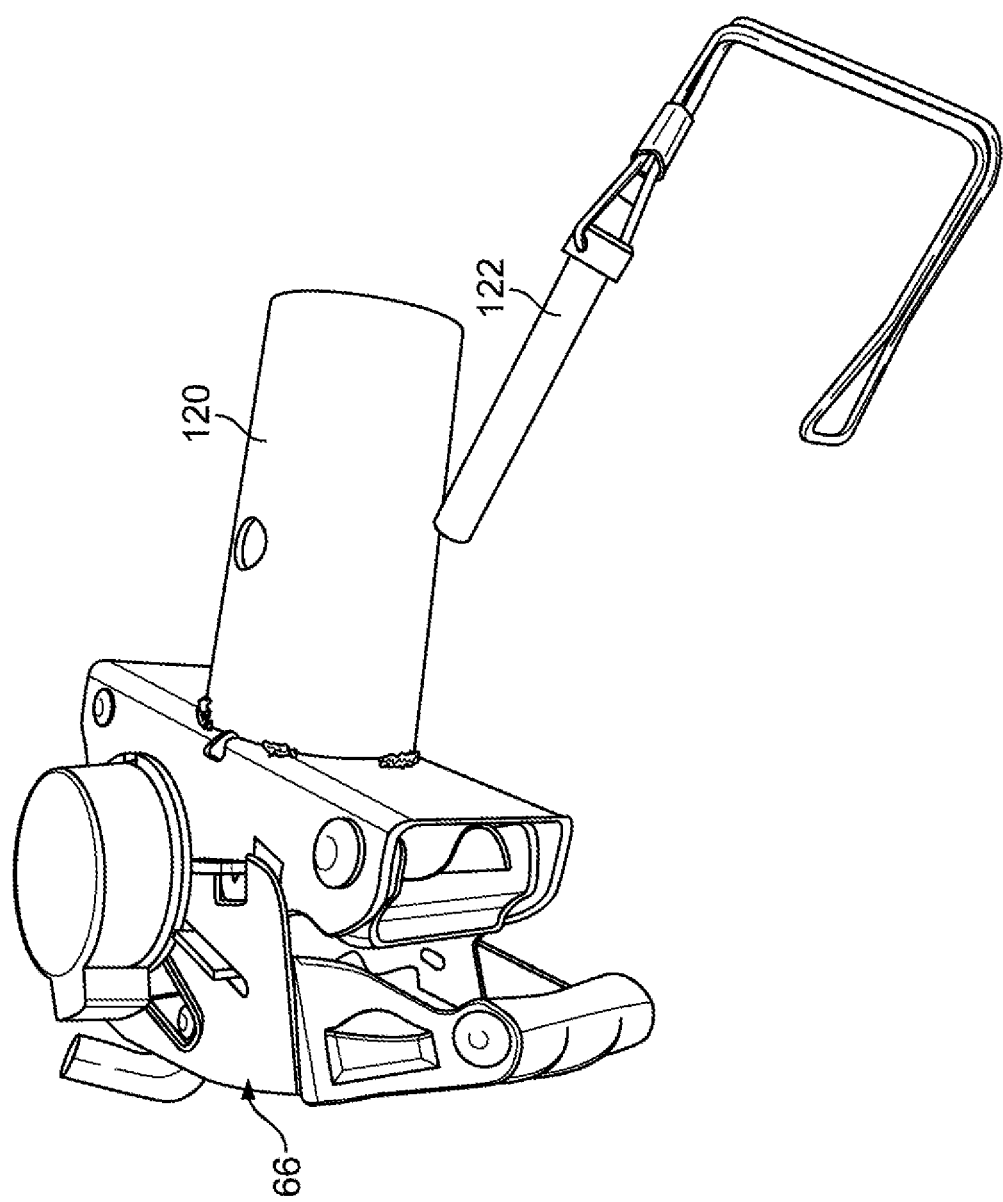
FIG. 29 is a perspective view of a tightening mechanism.
Figure 30:
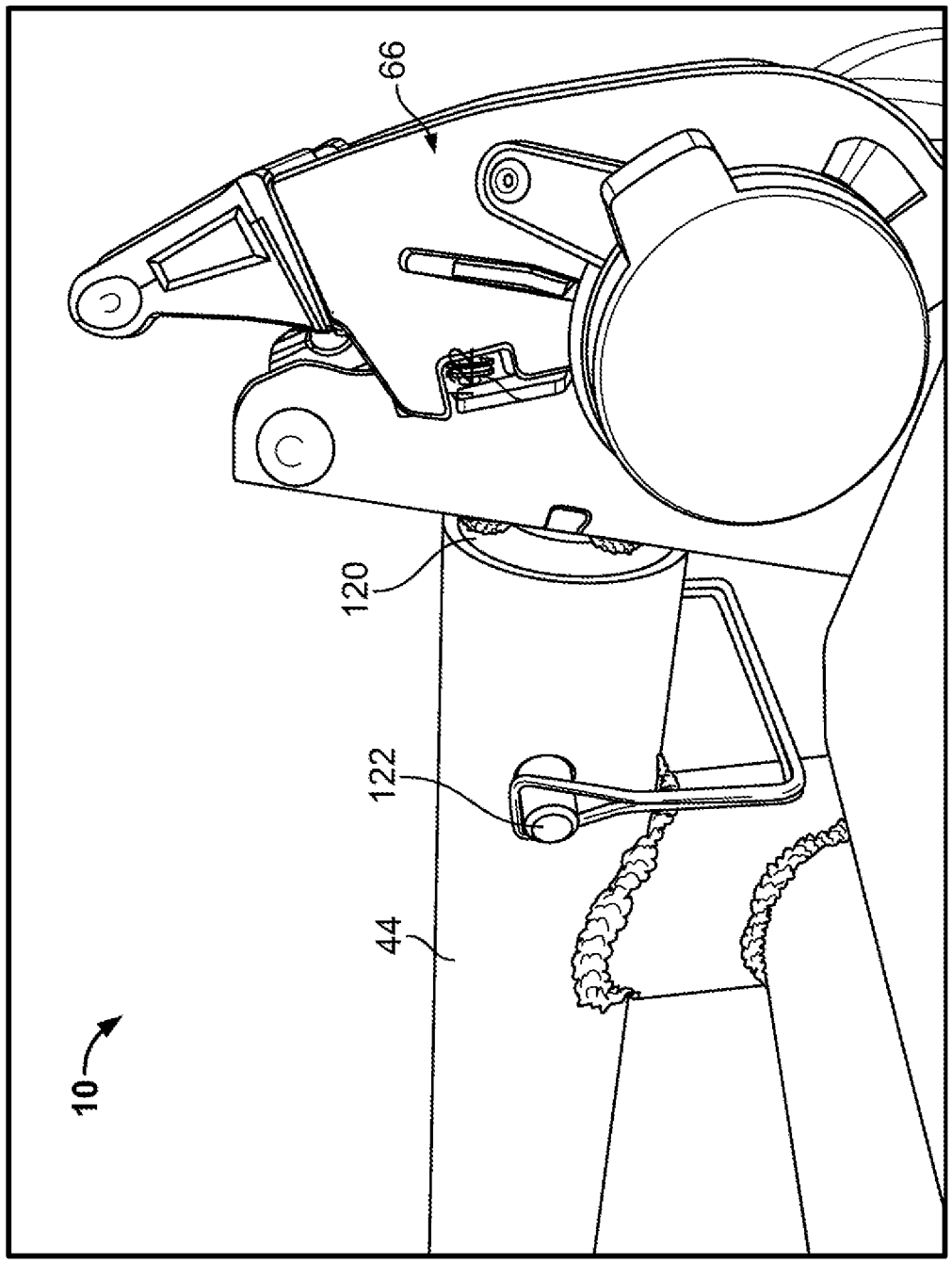
FIG. 30 is a view of a tightening mechanism having an end inserted into a crossbar having a circular cross-section.
Figure 31:
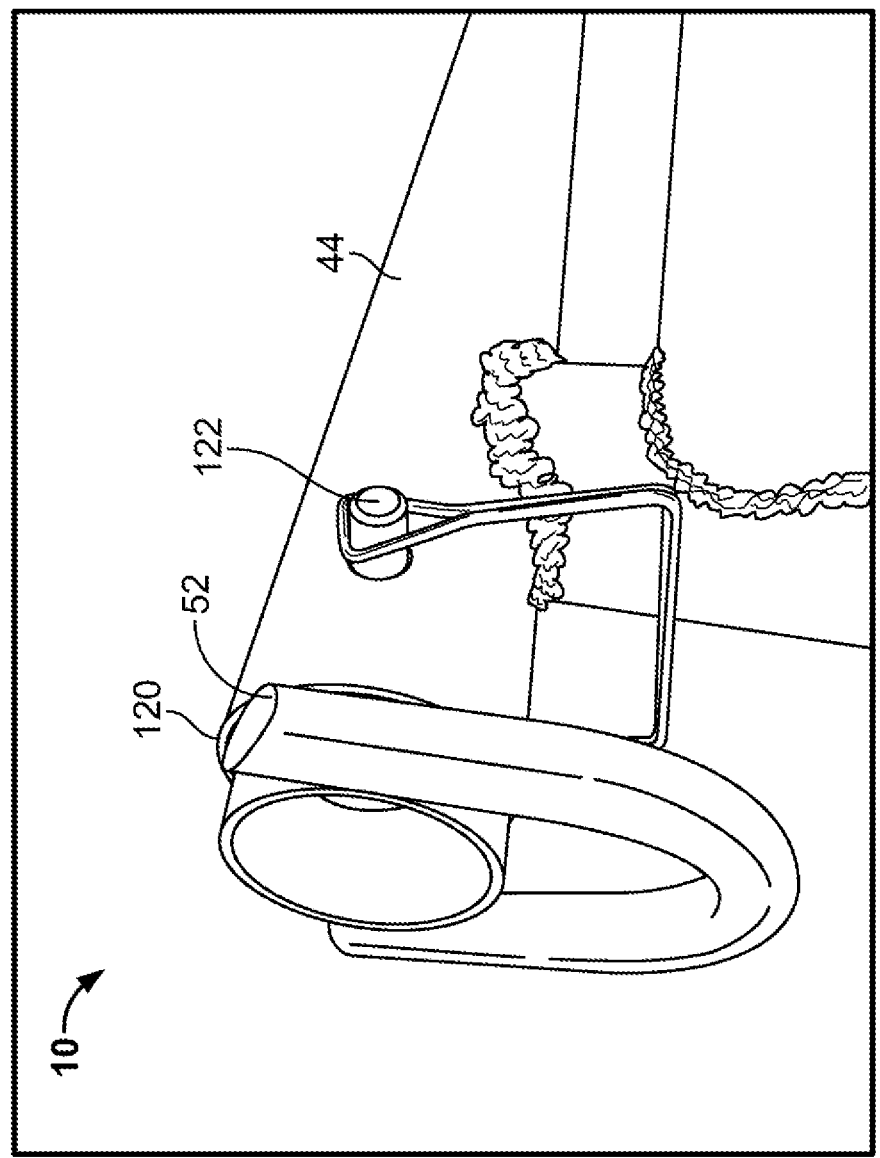
FIG. 31 is a view of an attachment mechanism arranged at an end of a crossbar having a circular cross-section.
Figure 32:
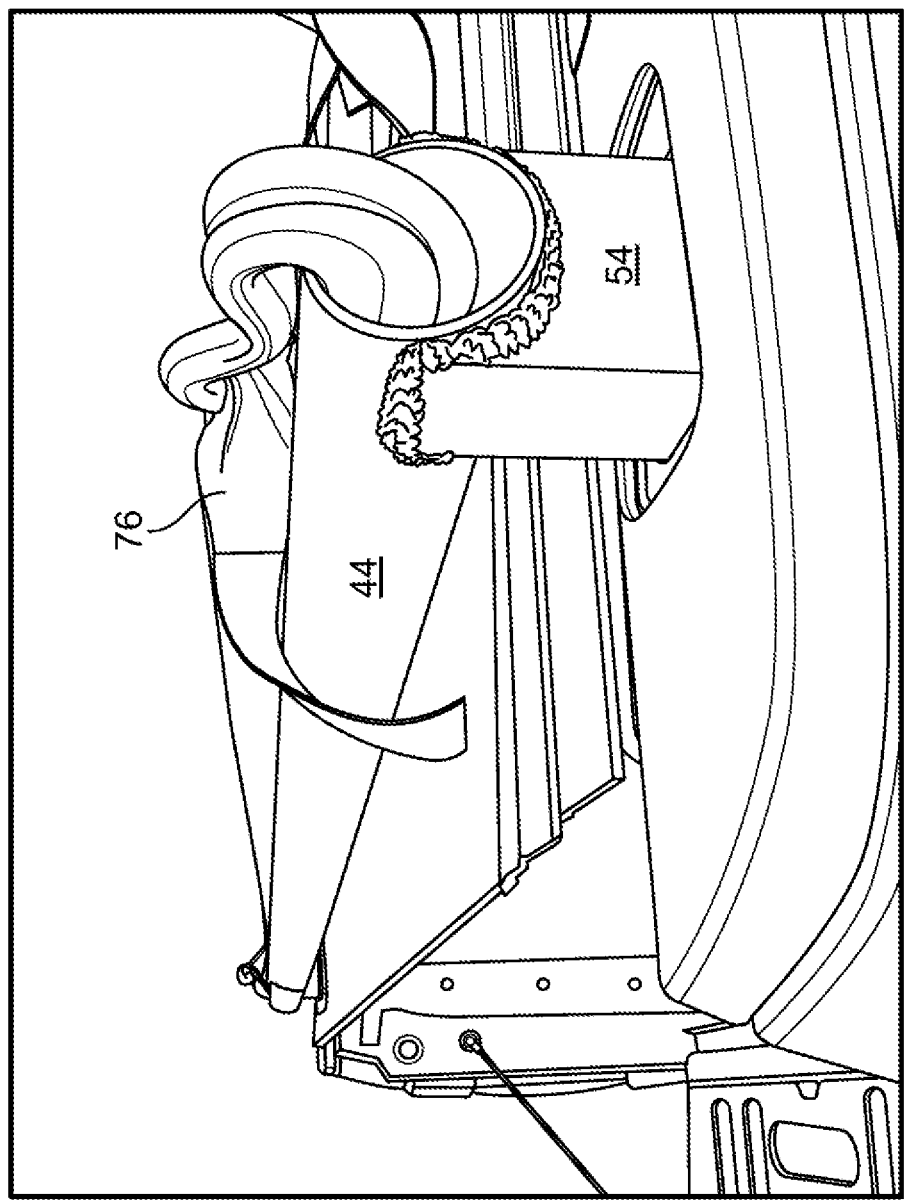
FIG. 32 is a view of a strap associated with a tailgate saver having a crossbar with a circular cross-section.
Figure 33:
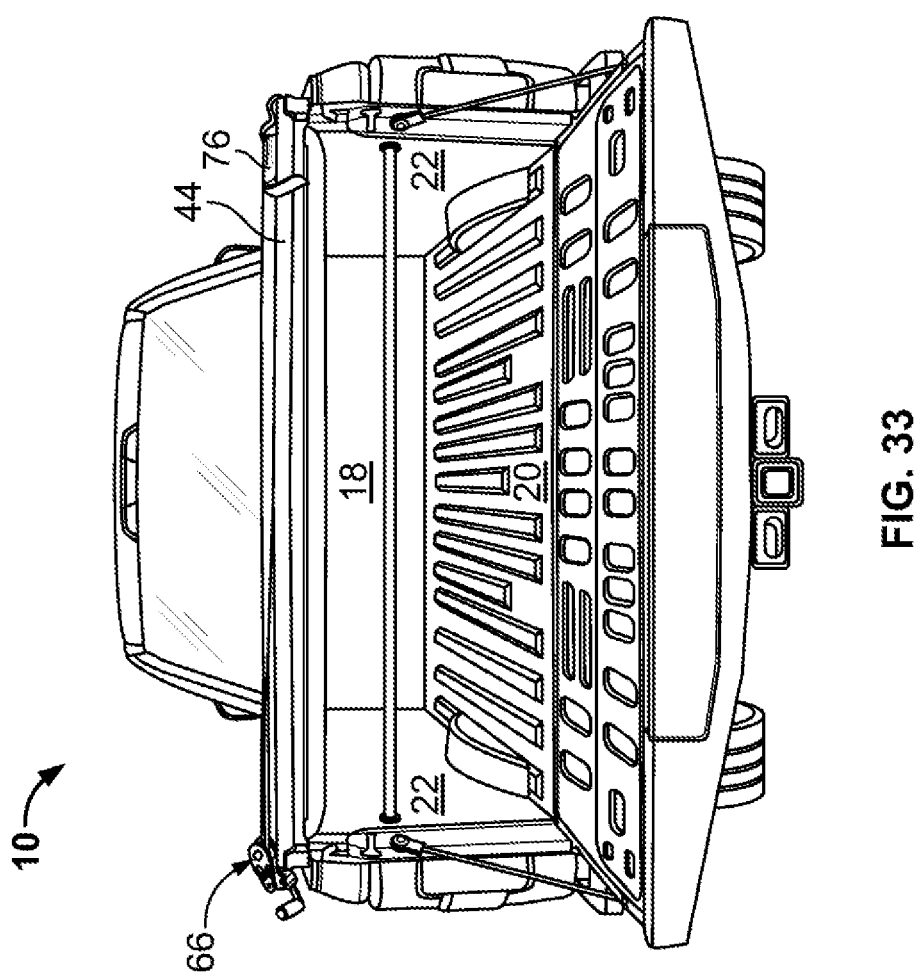
FIG. 33 is an end view of a vehicle having a tailgate saver mounted therein where the tailgate is in a lowered position.
Figure 34:
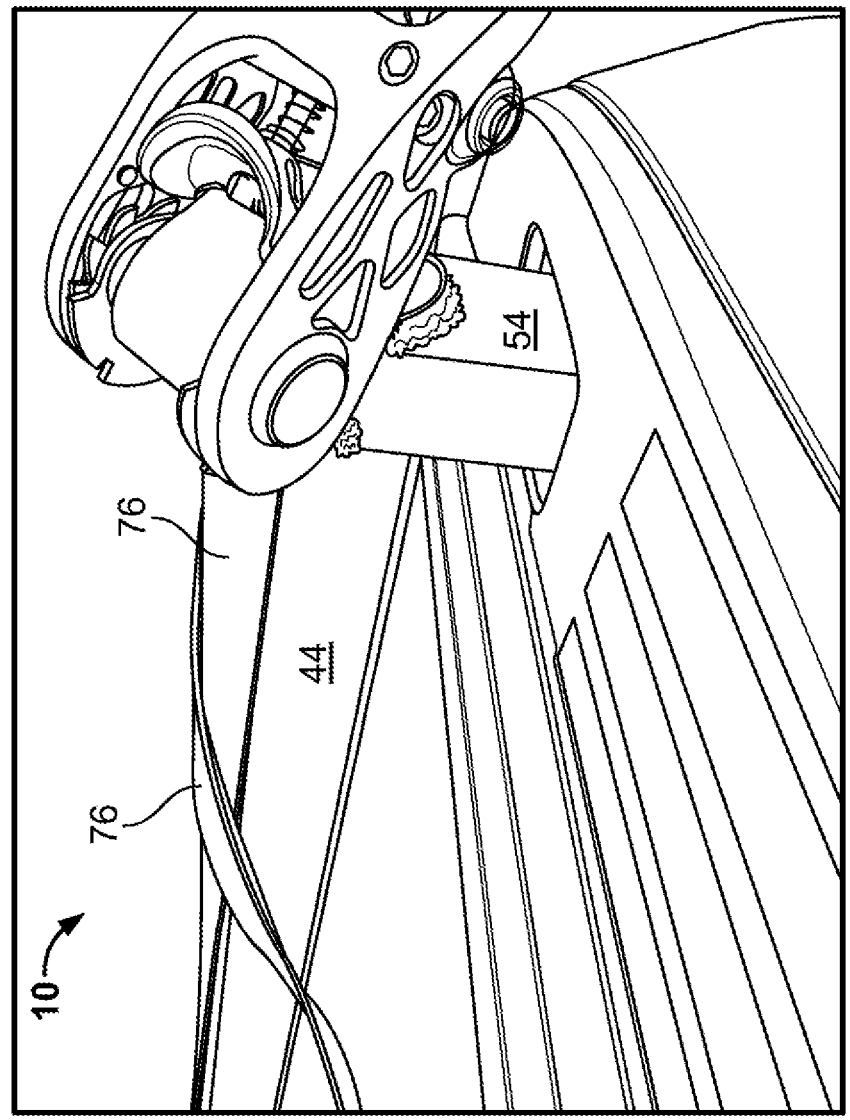
FIG. 34 is a close-up view of a tightening mechanism arranged at an end of a cross-bar having a circular cross-section.
Figure 35:
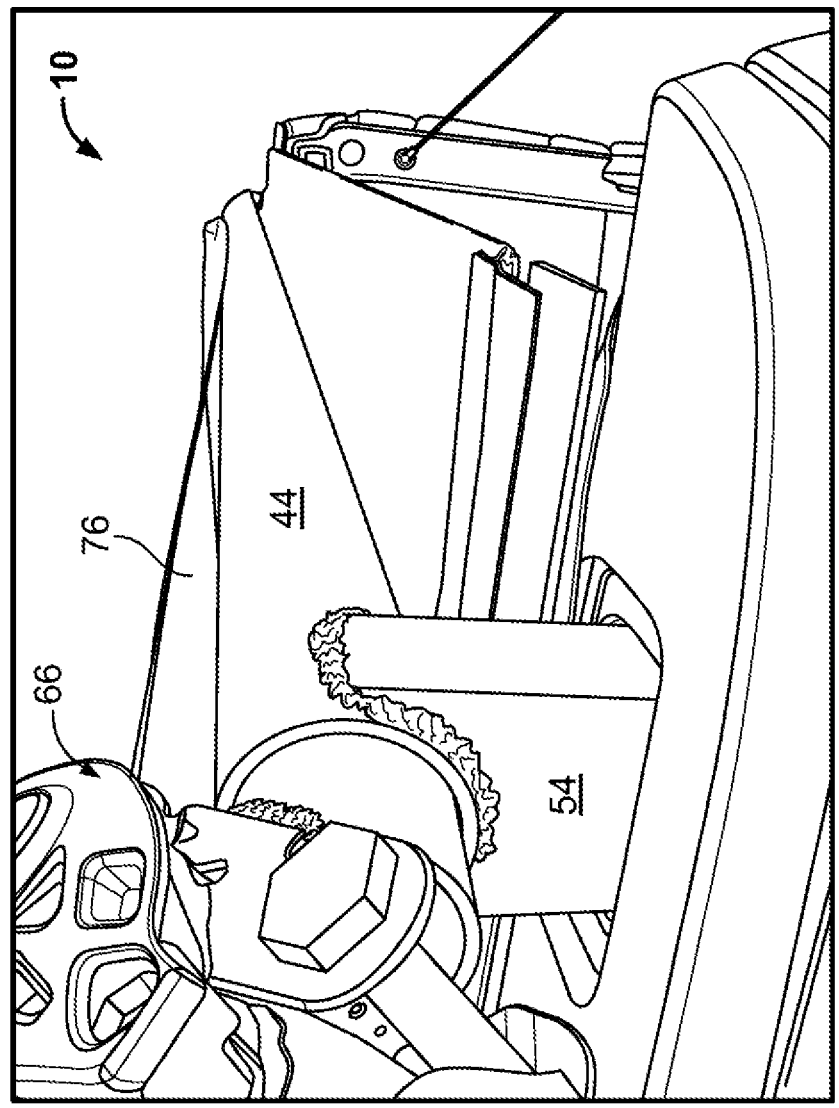
FIG. 35 is another close-up view of a tightening mechanism arranged at an end of a cross-bar having a circular cross-section.

A tailgate saver system is presented that allows elongated items to be quickly and easily stored in the bed of a pickup truck as well as preventing the elongated items from resting on the tailgate thereby allowing the tailgate to be opened and closed while elongated items are hauled in the bed of the pickup truck. In one arrangement, the tailgate saver system includes a crossbar having a pair of folding supports that are configured to be inserted within stake pockets of the bed of a pickup truck. A tightening mechanism is attached to the crossbar and a strap is attached to the tightening mechanism. When elongated items are placed in the bed of the pickup truck they rest on the crossbar and the strap is placed over the elongated items and is tightened in place thereby securing the elongated items in the bed of the pickup truck between the crossbar and the strap. In this way, the tailgate saver system improves the ease and safety of hauling elongated items.

DETAILED DESCRIPTION OF THE DISCLOSURE

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the disclosure.

System: With reference to the figures, a tailgate saver system 10 (or simply system 10) is presented. The tailgate saver system 10 is formed of any suitable size, shape and design and is configured to facilitate securing elongated items 12 hauled by a pickup truck 14. In the arrangement shown, as one example, pickup truck 14 includes a bed 16 having a forward wall 18, a bottom wall 20, opposing sidewalls 22, and fenders 24 having an exterior surface 26, a top edge 28 and stake pockets 30, among other features and components. In the arrangement shown, as one example, pickup truck 14 includes a tailgate 32 having an exterior surface 34, an interior surface 36, a top edge 38, hinges 40, and a handle mechanism 42, among other features and components. In the arrangement shown, as one example, tailgate saver system 10 includes: a crossbar 44 having opposing ends 46, a hollow interior 48, an adjustment mechanism 50, and an attachment mechanism 52; a pair of supports 54 having an upper end 56, a lower end 58, a hinge 60, a magnet 62 and an adjustment mechanism 64; a tightening mechanism 66 having a connection mechanism 68, a frame 70, a spool 72 and a handle 74; a strap 76 having a first end 78, a second end 80, among other components and features. In the arrangement shown, as one example, tailgate saver system 10 includes: lights 84, battery pack 86, wired connection 88 and trailer hitch plug 90, among other components and features.

Pickup Truck: In the arrangement shown, as one example, tailgate saver system 10 is configured to facilitate securing elongated items 12 hauled by a pickup truck 14. To be clear, tailgate saver system 10 is shown in use herein with pickup truck 14 which is only intended to be one of countless examples of use. Reference herein to pickup truck 14 is not meant to be limiting. Instead, it is to be understood that tailgate saver system 10 may be used in association with any type of vehicle or other device that hauls elongated items and or would benefit from the utility of tailgate saver system 10.

In the arrangement shown, as one example, pickup truck 14 includes a bed 16 that is configured to receive and hold items for transport, including elongated items 12. In the arrangement shown, as one example, bed 16 includes a forward wall 18, that defines the forward end of bed 16, a bottom wall 20, that defines the bottom of bed 16, and opposing sidewalls 22, that define the sides of bed 16. Opposing sidewalls 22 connect to fenders 24, which in the arrangement shown, as one example, include an exterior surface 26 that connects to a top edge 28. Top edge 28 of fenders 24 connect to the upper edge of opposing sidewalls 22.

In the arrangement shown, as one example, the top edge 28 of fenders 24 include stake pockets 30. State pockets 30 are openings in or adjacent bed 16 that are configured to receive and hold objects therein. In the arrangement shown, as one example, stake pockets 30 are openings in the top edge of fenders 28 at the rear end of fenders 28 and bed 16 near tailgate 32. In the arrangement shown, as one example, stake pockets 30 are square or rectangular in shape.

In the arrangement shown, as one example, bed 16 of pickup truck 14, with forward wall 18, bottom wall 20, and opposing sidewalls 22 as boundaries, forms a generally square or rectangular space that is configured to haul bulk items therein. The rearward end of bed 16 is enclosed by tailgate 14.

In the arrangement shown, as one example pickup truck 14 includes a tailgate 32. Tailgate 32 is formed of any suitable size, shape and design and is configured to enclose the rearward end of the bed 16. In the arrangement shown, as one example, tailgate 32 is a generally rectangular member that extends the width of bed 16, between opposing sidewalls 22 and the height of bed 16 between bottom wall 20 and top edge 28 of fenders 24.

In the arrangement shown, as one example, tailgate 32 includes an exterior surface 34, an interior surface 36 and a top edge 38 that extends between the upper edge of exterior surface 34 and interior surface 36. In the arrangement shown, as one example, tailgate 32 includes hinges 40 that connect tailgate 32 to bed 16 and facilitate movement of tailgate 32 between a raised position and a lowered position. In the arrangement shown, as one example, when in a raised position, the plane established by interior surface 36 of tailgate 32 extends in approximate perpendicular planar alignment to the plane established by bottom wall 20; and the plane established by interior surface 36 of tailgate 32 extends in approximate perpendicular planar alignment to the plane established by opposing sidewalls 22; and the plane established by interior surface 36 of tailgate 32 extends in approximate parallel planar alignment to the plane established by forward wall 18. In this way, when in raised position, tailgate 32 encloses the rearward end of bed 16. In the arrangement shown, as one example, when in a lowered position, the plane established by interior surface 36 of tailgate 32 extends in approximate parallel planar alignment to the plane established by bottom wall 20. In this way, when in a lowered position, tailgate 32 leaves the rearward end of bed 16 open, and extends the bottom wall 20 by the height of tailgate 32. When in a raised position, top edge 38 of tailgate 32 is in approximate alignment with the top edge 28 of fenders 24.

In the arrangement shown, as one example, tailgate 32 includes a handle mechanism 42. Handle mechanism 42 is formed of any suitable size, shape and design and is configured to facilitate opening and lowering of tailgate 32 to a lowered position as well as locking tailgate 32 in a raised position.

Bed 16 may be used to haul bulk items. When items are hauled in bed 16 and the tailgate is closed, the items remain relatively secure in the closed bed 16. When elongated items 12 are hauled, that are longer than bed 16, the user must make one of two choices: lower tailgate 32 and let the elongated items 12 lay flat on the bottom wall 20 and interior surface 36 of tailgate 32; or keep tailgate 32 in a raised position and let the elongated items 12 rest on the top edge 38 of tailgate 32. Lowering the tailgate 32 is undesirable because the elongated items 12 may easily fall out of the bed 16, as well as other items in the bed 16. Leaving the tailgate 32 in a raised position is undesirable as it prevents the tailgate 32 from being lowered and raised again once the elongated items 12 are placed in the bed 16, and the elongated items 12 may damage the tailgate 32. In addition, regardless whether the tailgate 32 is lowered or raised, there is no good way of securing the elongated items 12. The use of tailgate saver system 10 resolves these issues.

With reference to FIG. 1 through FIG. 19 a first embodiment of a tailgate saver system 10 is presented.

Crossbar:

In the arrangement shown, as one example tailgate saver system 10 includes a crossbar 44. Crossbar 44 is formed of any suitable size, shape and design and is configured to extend across the bed 16 of pickup truck 14 and provide support for elongated items 12. In the arrangement shown, as one example, crossbar 44 is formed of a square or rectangular tube that extends a length between opposing ends 46 and includes a hollow interior 48. While a square or rectangular hollow tube is shown for use as crossbar 44, this is only one of countless examples. Any other size, shape or design of a structural member is hereby contemplated for use including a flat bar, a round member, an oval member, a triangular member, a pentagonal member, a hexagonal member, a heptagonal member, an octagonal member, a nonagonal member, a decagonal member, or any other shaped member which may be solid, hollow or formed of one or multiple pieces or components.

In the arrangement shown, as one example, when crossbar 44 is a square or rectangular member, when installed on pickup truck 14, the opposing upper surface and lower surface of crossbar 44 are positioned in approximate parallel planar alignment with the plane formed by bottom wall 20 of bed 16, and the top edge 28 of fenders 24 and the top edge 38 of the tailgate 32, and the opposing forward surface and rearward surface are positioned in approximate perpendicular planar alignment with the plane formed by bottom wall 20 of bed 16, and the top edge 28 of fenders 24 and the top edge 38 of the tailgate 32. However, any other orientation or arrangement is hereby contemplated for use.

In the arrangement shown, as one example, opposing ends 46 angle inward as they extend upward. However, in other arrangements, opposing ends 46 may extend in perpendicular alignment to the opposing upper surface and lower surface and opposing forward surface and rearward surface of crossbar 44. Having ends 46 extend inward as they extend upward helps to position tightening mechanism 66 at a comfortable and useful angle, as is further described herein.

In one arrangement, crossbar 44 is a single continuous manner that extends across bed 16 without any breaks therein. This arrangement provides simplicity as crossbar 44 is a single solid piece. This arrangement also provides a strong, rigid and durable device as the as crossbar 44 is a single solid piece. The arrangement also provides simplicity as crossbar 44 is a single solid piece and there are no moving components to crossbar 44. One drawback to this arrangement is the fixed length of crossbar 44 causes tailgate saver system 10 to be specifically sized for a particular make and model of pickup truck 14 (unless supports 54 are adjustable). Other examples, however, anticipate a crossbar 44 being comprised of multiple pieces allowing the crossbar 44 to have an adjustable length.

Adjustment Mechanism: In another arrangement, crossbar 44 includes an adjustment mechanism 50. Adjustment mechanism 50 is formed of any suitable size, shape and design and is configured to facilitate adjustment of the length of crossbar 44. This allows crossbar 44 to extend and retract to meet the precise width of bed 16 (and stake pockets 30) for various makes and models of pickup trucks 14. As such, the inclusion of adjustment mechanism 50 in crossbar 44 allows a single tailgate saver system 10 to fit multiple pickup trucks 14. Drawbacks to this arrangement is increased cost, as compared to a single continuous member; increased complexity; as compared to a single continuous member; and the potential for a reduction in strength of tailgate saver system 10. These potential drawbacks can be reduced if not wholly nullified by proper design of adjustment mechanism 50.

In one arrangement, adjustment mechanism 50 is a telescoping arrangement, wherein one portion of crossbar 44 fits within another portion of crossbar 44 thereby allowing for the overall length of crossbar 44 to adjust as one portion of crossbar 44 slides into or out of another portion of crossbar 44. In this arrangement, the length of crossbar 44 may be secured by any manner, method or means. In one arrangement, the overlapping telescoping portions adjustment mechanism 50 of crossbar 44 include a plurality of holes therein that receive a locking pin through holes in the overlapping portions of crossbar 44 when they are aligned thereby setting length of crossbar 44 at predetermined positions. In one arrangement, the overlapping telescoping portions adjustment mechanism 50 of crossbar 44 include a clamping mechanism that clamps or tightens the overlapping portions of crossbar 44 to one another thereby setting length of crossbar 44. This may include the exterior overlapping portion of adjustment mechanism 50 of crossbar 44 receiving one or more threaded shafts in a threaded collar that when tightened engages the interior overlapping portion of adjustment mechanism 50 of crossbar 44 thereby setting the length of crossbar 44. One benefit of this clamping arrangement is that the length of crossbar 44 may be infinitely adjustable. In one arrangement, the overlapping telescoping portions adjustment mechanism 50 of crossbar 44 include a spring loaded detent system. This may include the exterior portion of the overlapping portions of adjustment mechanism 50 of crossbar 44 having a button operated spring loaded detent that includes an engagement member that is received in a recess or opening in the interior portion of the overlapping portions of adjustment mechanism 50. Any other manner, method or means of an adjustment mechanism 50 is hereby contemplated for use.

In another arrangement, adjustment mechanism 50 includes a threaded arrangement wherein one portion of crossbar 44 threads into and out of another portion of crossbar 44 thereby extending and retracting the length of crossbar 44. One benefit of this arrangement is that the length of crossbar 44 may be infinitely adjusted. In addition, the length of crossbar 44 may be locked in place by providing a locking collar (e.g. a nut) on the threaded member that locks the threaded member at a desired length.

Any other arrangement of facilitating the extension and retraction of crossbar 44 is hereby contemplated for use as adjustment member 50.

Attachment Member:

In the arrangement shown, as one example tailgate saver system 10 includes an attachment member 52. Attachment member 52 is formed of any suitable size, shape and design and is configured to facilitate connection of strap 76 to tailgate saver system 10 so as to facilitate securing elongated items 12 to tailgate saver system 10. In one arrangement, as is shown, attachment member 52 is connected to an end 46 of crossbar 44 opposite the end 46 where tightening mechanism 66 is attached. In this way, one end of strap 76 is connected to attachment member 52 adjacent one end 46 of crossbar 44 and the other end of strap 76 is connected to tightening mechanism 66 adjacent the other end 46 of crossbar 44.

In the arrangement shown, as one example, attachment member 52 is formed of an L-shaped rod or bar. One leg of the L-shaped attachment member 52 is connected adjacent one end 46 of crossbar 44 and extends in parallel with the length of crossbar 44 and the other leg of the L-shaped member extends in approximate perpendicular alignment to the length of crossbar 44 before terminating in a free end. This free end allows a loop of strap 76 to be passed over the attachment member 52 thereby facilitating attachment of the loop of strap 76 to the tailgate saver system 10. In one arrangement the connected end of attachment member 52 is welded to crossbar 44, however any other manner of connection is hereby contemplated for use such as screwing, bolting, machining or the like.

Any other configuration or placement of attachment member 52 is hereby contemplated for use.

Pair of Supports:

In the arrangement shown, as one example tailgate saver system 10 includes a pair of supports 54, or simply supports 54 collectively, or support 54 individually. Supports 54 are formed of any suitable size, shape and design and is configured to connect to crossbar 44 and fit within stake pockets 30 thereby connecting tailgate saver system 10 to the bed 16 of pickup truck 14. In the arrangement shown, as one example, supports 54 are formed of a square or rectangular tube that extends a length between opposing upper end 56 and lower end 58 and includes a hollow interior 92. In the arrangement shown, as one example, supports 54 are formed of the same sized and shaped member as crossbar 44. In another arrangement, supports 54 are formed of a slightly smaller member than crossbar 44. In one arrangement, as is shown, as the lower end 58 of supports 54 is configured to fit within stake pockets 30, supports 54 are sized and shaped to fit within stake pockets 30 close and tight tolerances, so as to minimize wobbling, rattling and other movement, while also allowing easy slid-in insertion and slide-out removal from stake pockets 30. While a square or rectangular hollow tube is shown for use as supports 54, this is only one of countless examples. Any other size, shape or design of a structural member is hereby contemplated for use including a flat bar, a round member, an oval member, a triangular member, a pentagonal member, a hexagonal member, a heptagonal member, an octagonal member, a nonagonal member, a decagonal member, or any other shaped member which may be solid, hollow or formed of one or multiple pieces or components.

In the arrangement shown, as one example, when supports 54 and crossbar 44 are formed of square or rectangular members, when installed on pickup truck 14, the opposing forward surface and rearward surface are positioned in approximate perpendicular planar alignment with the plane formed by bottom wall 20 of bed 16, and the top edge 28 of fenders 24 and the top edge 38 of the tailgate 32. Or, said another way, the opposing forward surface and rearward surface of supports 54 and crossbar 44 are positioned in approximate planar alignment with one another.

In one arrangement, supports 54 are fixedly attached to crossbar 44 in a perpendicular alignment. That is, in this arrangement, supports 54 extend downward in approximate perpendicular alignment to the length of crossbar 44 and are fixed in this orientation. Said another way, in this arrangement, supports 54 are permanently connected to crossbar 44 in a non-removable manner, such as welding or the like. This arrangement provides the benefit of being simple in design and strong and rigid. However, this arrangement does not allow the supports 54 to fold or be removed to minimize space requirement for storage.

In another arrangement, as is shown in the example, supports 54 are connected to crossbar 44 by a hinge 60. Hinge 60 is formed of any device that connects support 54 to crossbar 44 and allows support 54 to move between an extended position, wherein support 54 extends outward from crossbar 44 in approximate perpendicular alignment, and a folded or retracted position, wherein the length of support 54 extends in approximate parallel alignment to the length of crossbar 44. In the arrangement shown, as one example, hinge 60 is a conventional barrel hinge, however any other hinge design is hereby contemplated for use. In one arrangement, as is shown, hinges 60 are positioned at the inward facing sides of opposing supports 54 at the intersection between the lower surface of crossbar 44 and the inward facing side of supports 54.

Hinges 60 are connected to supports 54 by any manner method or means such as screwing, bolting, welding or the like attachment methods or means.

The use of hinges 60 allow supports 54 to quickly and easily move between an extended position, wherein supports 54 extend outward from crossbar 44 in an approximate perpendicular alignment such that the supports 54 may be inserted within the stake pockets 30, and a retracted position, wherein supports 54 extend in a folded position along the length of crossbar 44 in an approximate parallel alignment such that the tailgate saver system 10 can be stored taking up a minimum amount of space.

In one arrangement, to help ensure that supports 54 remain in a retracted position, one or more magnets 62 are used to hold support 54 in a retracted position. In this arrangement, as one example one or more magnets 62 are connected to the inward facing surface of support 54, or a one or more magnets 62 are connected to the lower surface of crossbar 44, or one or more magnets 62 are connected to both the inward facing surface of support 54 and the lower surface of crossbar 44. In this arrangement, when support 54 is moved to a folded position, the one or more magnets 62 magnetically hold support 54 in a folded position.

Similarly, in one arrangement, to help ensure that supports 54 remain in an extended position, one or more magnets 62 are used to hold support 54 in an extended position. In this arrangement, as one example one or more magnets 62 are connected adjacent the upper end 56 of support 54, or a one or more magnets 62 are connected to the lower surface of crossbar 44, or one or more magnets 62 are connected to both the upper end 56 of support 54 and the lower surface of crossbar 44. In this arrangement, when support 54 is moved to an extended position, the one or more magnets 62 magnetically hold support 54 in an extended position.

Any other arrangement of ensuring that supports 54 remain in an extended position or folded position, while still allowing for quick and easy movement between an extended position and folded position, is hereby contemplated for use such as having the proper amount of friction in hinge 60, using a hook, screw or bolt, or using any other system, method or means.

In an alternative arrangement, instead of using hinges 60 to connect supports 54 to crossbar 54, supports 54 are connected by a screw, bolt or threaded shaft arrangement. In an alternative arrangement, instead of using hinges 60 to connect supports 54 to crossbar 54, supports 54 fit over a collar connected to crossbar 44 and are locked in place with a screw, bolt, locking pin or the like. In an alternative arrangement, instead of using hinges 60 to connect supports 54 to crossbar 54, the upper end 56 of supports 54 fit within an opening in the lower surface of crossbar 44 and are locked in place with a screw, bolt, locking pin or the like. Any other arrangement of connecting supports 54 to crossbar 44 in a removable manner is hereby contemplated for use.

In one arrangement, supports 54 are fixed in length. In another arrangement, supports 54 include an adjustment mechanism 64 that adjusts the length of supports 54 in much the same manner, if not the identical manner, that adjustment mechanism 50 adjusts the length of crossbar 44. As such, for the purposes of brevity, the portions directed to adjustment 50 for crossbar 44 are repeated for adjustment mechanism 64 for supports 54.

Tightening Mechanism:

In the arrangement shown, as one example tailgate saver system 10 includes a tightening mechanism 66. Tightening mechanism 66 is formed of any suitable size, shape and design and is configured to connect to tailgate saver system 10 and tighten strap 76. In the arrangement shown, as one example, tightening mechanism 66 is a ratcheting mechanism that includes a connection mechanism 68, a frame 70, a spool 72 and a handle 74 that collectively receive and selectively tighten strap 76. Connection mechanism 68 is formed of any suitable size, shape and design and is configured to attach to crossbar 44. Frame 70 is formed of any suitable size, shape and design and is configured to attach to connection mechanism 68, which connects to crossbar 44, as well as hold spool 72 and handle 74 and other components of the tightening mechanism 66 in a manner that allows them to move and operate as is needed. Spool 72 is formed of any suitable size, shape and design and is configured to be held by frame 70 and is configured to receive the second end 80 of strap 76 and allow strap 76 to wrap around spool 72 and unwrap around spool 72 as is desired. Handle 74 is formed of any suitable size, shape and design and is configured to connect to frame 70 and operatively engage spool 72 so as to facilitate tightening of spool 72. In one arrangement, tightening mechanism 66 also includes a ratcheting arrangement that holds the spool 72 in place when desired so as to hold tension on strap 76, as well as allows selective release of the tension of strap 76.

In the arrangement shown, as one example, tightening mechanism 66 is connected to an outward end 46 of crossbar 44. When the end 46 of crossbar 44 is angled, the spool 72 is positioned at the inward or upper end of crossbar 44 and the end of handle 74, opposite spool 72, is positioned at the lower or outward end of crossbar 44. This arrangement allows a user to have easy and ergonomic access and operation of the tightening mechanism 66.

Strap:

In the arrangement shown, as one example tailgate saver system 10 includes a strap 76. Strap 76 is formed of any suitable size, shape and design and is configured to facilitate securing elongated items 12 to tailgate saver system 10 so that they do not fall out of the bed 16 of pickup truck 14. In the arrangement shown, as one example, strap 76 is any flexible member that extends a length between a first end 78 and a second end 80. In the arrangement shown, as one example, strap 76 is a fabric strap, such as nylon or the like, however any other material is hereby contemplated for use.

In one arrangement as is shown, first end 78 of strap 76 includes a loop. A loop positioned at the first end 78 of strap 76 is convenient as it can easily be slipped over the free end of attachment member 52. In another arrangement, the first end 78 of strap 76 includes a hook. A hook positioned at the first end 78 of strap 76 is convenient as it can easily be slipped over the free end of attachment member 52. In one arrangement, strap 76 includes a plurality of loops or hooks or other attachment features that are positioned along its length beginning at the first end 78.

In one arrangement as is shown, second end 80 is connected to spool 72 of tightening mechanism 66. As the spool 72 spins in a tightening direction by operation of handle 74 an increasing amount of the length of strap 76 wraps around spool 72. When the first end 78 is fixed to attachment member 52, as the spool 72 takes up length of strap 76, the strap 76 is tightened along the length of crossbar 44.

In Operation:

When a user desires to haul elongated objects 12 that are longer than the bed 16 of a pickup truck 14, the tailgate saver system 10 may be used.

When the tailgate saver system 10 is in a storage position, first the user extends the supports 54 from a folded position, where the length of supports 54 extend in approximate parallel relation to the length of crossbar 44, to an extended position, where the length of supports extend in approximate perpendicular alignment to the length of crossbar 44. When moving supports 54 from a folded position to an extended position, the user must apply sufficient force to overcome the magnetic attraction of the one and more magnets 62 that hold supports 54 in a folded position. When the supports 54 are moved to an extended position, where the length of supports extend in approximate perpendicular alignment to the length of crossbar 44, the one or more magnets 62 help to hold the supports 54 in an extended position.

Once both supports 54 are in an extended position, the lower end 58 of supports 54 are aligned with the stake pockets 30 in the top edge 28 of fenders 24. Once the lower end 54 of supports 54 are aligned with the stake pockets 30, the tailgate saver system 10 is lowered into the pickup truck 14. In doing so, the lower end 58 of supports 54 slide within the stake pockets 30 with close and tight tolerances until the lower end 58 of supports 54 engage the lower end of stake pockets 30, which is what is shown in the figures, or alternatively the lower surface of crossbar 44 engages the top edge 28 of fenders 24.

Once supports 54 are fully supported within stake pockets 30, elongated items 12 may be loaded into the bed 16 of pickup truck 14. In doing so, the forward end of elongated items 12 is placed adjacent the intersection of the bottom wall 20 of bed 16 and the forward wall 18 of bed 16 while the elongated item 12 rests upon crossbar 44. Once all of the elongated items 12 are inserted into bed 16, the first end 78 of strap 76 is looped over attachment member 52, thereby fixing the first end 78 of strap 76 to tailgate saver system 10. In doing so, care is taken to ensure that all of the elongated items 12 are positioned between crossbar 44 and strap 76. Next, strap 76 is tightened by operation of handle 74 which causes spool 72 to spin and take up length of strap 76 while the ratcheting mechanism prevents spool 72 from giving up length of strap 76. This is continued until adequate tension is placed on strap 76 thereby securing elongated items 12 between crossbar 44 and strap 76.

This entire process may take only seconds to perform.

In this position, elongated items 12 can be confidently hauled without fear that they will fall out or slide out of tailgate 16. Also, in this position, as the tailgate 32 is not encumbered in any way by the elongated items 12, the tailgate 32 may freely be raised and lowered to that additional items may be placed within and removed from the bed 16 of pickup truck 14.

When the user arrives at their location and desires to remove elongated items, the user simply engages the ratcheting mechanism, thereby allowing the spool 72 to give up length of strap 76 thereby releasing tension or pressure on elongated items 12. Once tension is released on strap 76 the elongated items 12 may be slid out of between crossbar 44 and strap 76. Alternatively, the loop at the first end 78 of strap 76 may be removed from around attachment member 52 thereby allowing removal of strap 76 from being over elongated items 12 altogether thereby allowing unencumbered removal of elongated items from bed 16 of pickup truck 14.

Lights:

Safety is of utmost importance. In one arrangement, to improve safety and to alert others to the user hauling elongated items 12, in one arrangement crossbar 44 includes one or more lights 84 therein. Lights 84 may be formed of any suitable size, shape and design. In one arrangement, only a single light 84 is placed in crossbar 44. In another arrangement, crossbar 44 includes a plurality of lights 84 therein. In one arrangement, a plurality of lights 84 and/or a strip of lights 84 extend across the length of crossbar 44 from end 46 to end 46.

Lights 84 may be a single color, or alternatively lights 84 may be able to project multiple colors, or there may be multiple lights 84 of multiple colors. In one arrangement, lights 84 include red, white and orange, which is common in the automotive industry. In one arrangement, lights 84 are connected by way of a wired connection 88 to the electrical system of pickup truck 14 and thereby receive power as well as control signals from the electrical system of pickup truck 14. In this way, by way of wired connection 88 lights 84 of tailgate saver system 10 may illuminate in like kind with the lights of pickup truck 14.

That is, as one example, when the brake lights of pickup truck 14 illuminate, the red brake lights 84 of tailgate saver system 10 similarly illuminate. As another example, when the backup lights of pickup truck 14 illuminate, the white backup lights 84 of tailgate saver system 10 similarly illuminate. As another example, when the headlights (and taillights) of pickup truck 14 illuminate, the running lights 84 of tailgate saver system 10 similarly illuminate to the proper intensity. As another example, when the turn signal lights of pickup truck 14 illuminate, the red or amber lights 84 on one side of tailgate saver system 10 similarly illuminate. As another example, when the hazard lights of pickup truck 14 illuminate, the amber lights 84 of tailgate saver system 10 similarly illuminate. These are just some of the examples of operation of lights 84.

Wired connection 88 may electrically connect to any electrical connection of pickup truck 14. This may include being hard wired into the fuse box of pickup truck 14, being tapped into the brake lights and turn signals and other electrical lines of pickup truck 14 or by being connected to any other electrical connection or lead of pickup truck 14. In one arrangement, to facilitate easier electrical connection a trailer hitch plug 90 is connected to wired connection 88 which facilitates quick and easy and removable connection to a trailer hitch plug of pickup truck 14. This is especially convenient as most pickup trucks 14 come factory equipped with a trailer hitch plug that is generally one of a few standard configurations. In this arrangement, once the tailgate saver system 10 is installed in the stake pockets 30, the trailer hitch plug 90 of the wired connection 88 is simply plugged into the trailer hitch plug of pickup truck 14 thereby powering as well as providing control signals to the lights 84 of tailgate saver system 10.

Battery Pack:

In an alternative arrangement, instead of using wired connection 88 to connect to the electrical system of pickup truck 14, tailgate saver system 10 includes a battery pack 86 that is formed of one or more batteries that supply power to lights 84 and/or any other electrical component of tailgate saver system 10. Battery pack 86 is formed of is formed of any suitable size, shape and design. In one arrangement, battery pack 86 is positioned within the hollow interior 48 of crossbar 44. This makes for a slick and sleek arrangement as there are no external wires or battery packs as all electrical components are positioned within the crossbar 44. In an alternative arrangement, battery pack 86 is connected by wired connection 88 to the electrical components of tailgate saver system 10 such as lights 84. The use of battery pack 86 obviates the need to electrically connect to the electrical system of pickup truck 14 thereby simplifying the installation process.

Warning Lights:

Providing a warning to other drivers when elongated items 12 extend outward past the end of pickup truck 14 is a good safety practice, not to mention it is a legal requirement in most if not all jurisdictions. Many users attach a flag to the end of elongated items 12. Whether lights 84 are connected to the electrical system of pickup truck 14 or not, in one arrangement, to supplement or replace a flag, lights 84 are configured to illuminate by way of activation of a button, switch or any other control when elongated items 12 extend outward past the end of pickup truck 16. Lights 84 may illuminate in a continuous manner, a flashing manner, or any other manner. In this way, lights 84 of tailgate saver system 10 may supplement and/or replace the use of a flag in warning other drivers of the presence of protruding elongated items 12.

Alternative Arrangement—Sleeve:

In the arrangement shown, as one example, with reference to FIG. 19 through FIG. 26 an alternative arrangement of a tailgate saver system 10 is presented. In this arrangement, instead of crossbar 44 extending all the way across bed 16 of pickup truck 14, a sleeve 100 is connected to the upper end of supports 54. Sleeves 100 are formed of any suitable size, shape and design and is configured to receive a user-supplied and removable crossbar 102 therein.

In the arrangement shown, as one example, sleeves 100 are generally square or rectangular members that have a hollow interior 104 that are configured to allow crossbar 102 to be slid into the hollow interior 104. In the arrangement shown, as one example, sleeves 100 are sized and shaped to receive a conventional 2×4 board therein. However, any other size, shape or design of sleeves 100 are hereby contemplated for use such as a round member, an oval member, a triangular member, a pentagonal member, a hexagonal member, a heptagonal member, an octagonal member, a nonagonal member, a decagonal member, or any other shaped member that receives a correspondingly-shaped crossbar 102 therein.

In the arrangement shown, as one example, wherein sleeves 100 are configured to receive a 2×4, the user purchases the tailgate saver system that includes everything described herein except the crossbar 102. The user then secures the crossbar 102, which is widely available at any hardware store or lumber supply company. The user then inserts the supports 54 into the stake pockets 30 of the bed 16 of pickup truck 14 in the manner described herein. The user also slides the crossbar 102 (the 2×4) into and through one of the sleeves 100 and into the opposing sleeve 100 such that the crossbar 102 (the 2×4) extends across the width of tailgate 32 and is held in both sleeves 100. The user may cut down the crossbar 102 (the 2×4) when desired to ensure it is of proper length.

In one arrangement, once crossbar 102 (the 2×4) is installed into sleeves 100, crossbar 102 (the 2×4) is locked in place using a locking member 106 which operates by any manner, method or means, such as screwing, bolting, clamping or affixing. In one arrangement, sleeves 100 includes a threaded shaft that threadably engages a collar in the sleeve 100. In this arrangement, when the crossbar 102 (the 2×4) is in place within the sleeve 100 the locking member 106 is rotated by a head or handle on the threaded shaft until the locking member 106 tightens against the crossbar 102 (the 2×4) thereby locking it in place. Once this is performed for both sleeves 100, the crossbar 102 (the 2×4) is locked in place and the tailgate saver system 10 may be used in the manner described herein.

This same process may be used of any other shaped crossbar 102 such as a circular pipe, a 1×1, a 2×6 or any other crossbar 102.

This arrangement, with sleeves 100, provides the benefit of making tailgate saver system 10 initially less expensive, as the user does not have to initially pay for crossbar 44/102. Instead, and especially in the case of the use of a 2×4, the user may secure their own crossbar 102 which many people have laying around as scrap. Also, this arrangement makes storage of tailgate saver system 10 much easier as the user may remove crossbar 102 and store only the sleeves 100 and attached components.

Alternative Arrangement—Round Crossbar:

In the arrangement shown, as one example, with reference to FIG. 27 through FIG. 35 an alternative arrangement of a tailgate saver system 10 is presented. In this arrangement, instead of crossbar 44 being a square or rectangular member, crossbar 44 is formed of a round tube. One benefit of using a round tube for crossbar 44 is that is moves through the air with less noise than a square or rectangular crossbar 44.

Also, in this arrangement, as is shown, as one example, tightening mechanism 66 connects to a cylindrical member 120 that is configured to be inserted within the hollow interior 48 of crossbar 44 at an end 46. This insertion of cylindrical member 120 within the cylindrical hollow interior of crossbar 44 allows the rotation of tightening mechanism 66 on crossbar 44 as the tightening mechanism 66 is tightened. This allows the tightening mechanism 66 to seek its own optimum position when tightened relative to crossbar 44.

Similarly, attachment member 52 may be attached to a cylindrical member 120 that is inserted in the opposite end of crossbar 44 that provides the same benefits.

In one arrangement, cylindrical members 120 are held in place in an end of crossbar 44 by using pin 122 that extends through crossbar 44.

From the above discussion it will be appreciated that the tailgate saver system and method presented herein improves upon the state of the art.

Specifically, the tailgate saver system and method presented: prevents elongated items from resting on the tailgate of a pickup truck; facilitates the opening and closing of a tailgate when hauling elongated items; helps to prevent items from falling out of the bed of a pickup truck; helps to prevent items from sliding out of the bed of a pickup truck; makes it easier to haul items in the bed of a pickup truck; protects the tailgate of a pickup truck; makes it easier to secure elongated items in the bed of a pickup truck; is adjustable for use in various pickup trucks; improves safety; is safe to use; is easy to use; compacts for storage; is strong; is easy to install; is easy to remove; provides a convenient way of securing elongated items in the bed of the pickup truck; improves efficiencies; improves the functionality of a pickup truck; has a low profile; has many uses; does not interfere with covers over the bed, among countless other advantages and improvements.

Figure 36A:
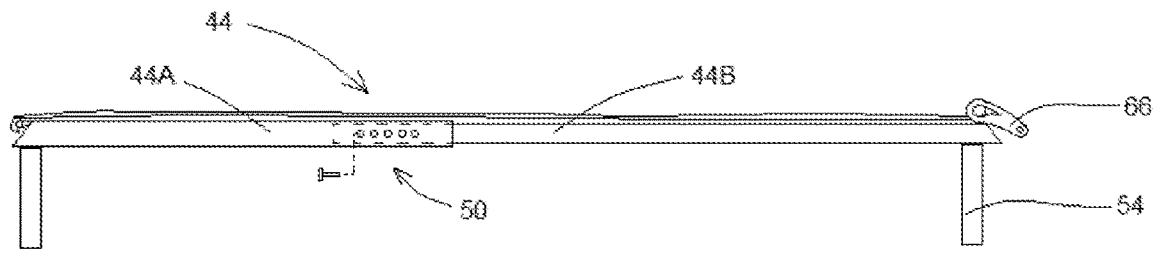
FIGS. 36A-36C represents alternative tailgate saver configurations having built-in adjustability in the cross-bar.
Figure 36B:
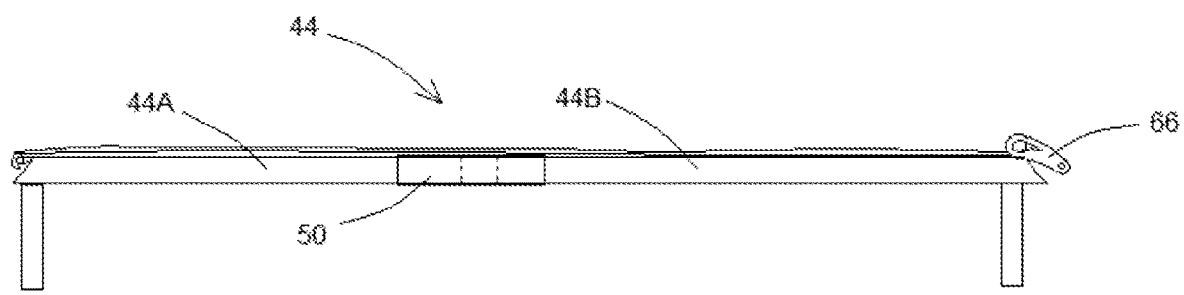
Figure 36C:
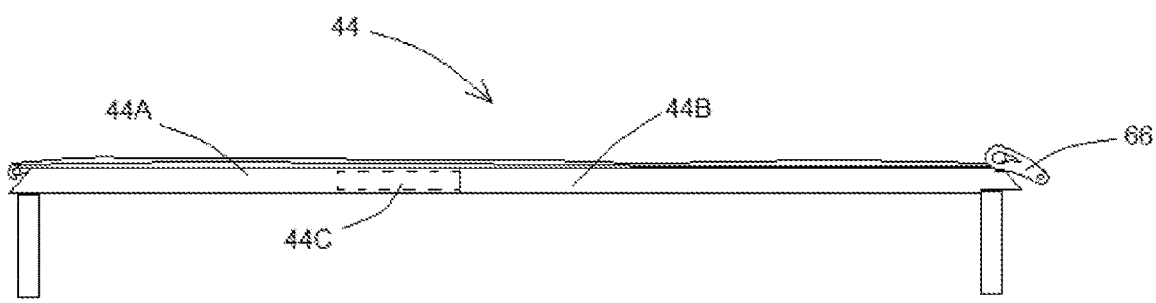
Figure 37:
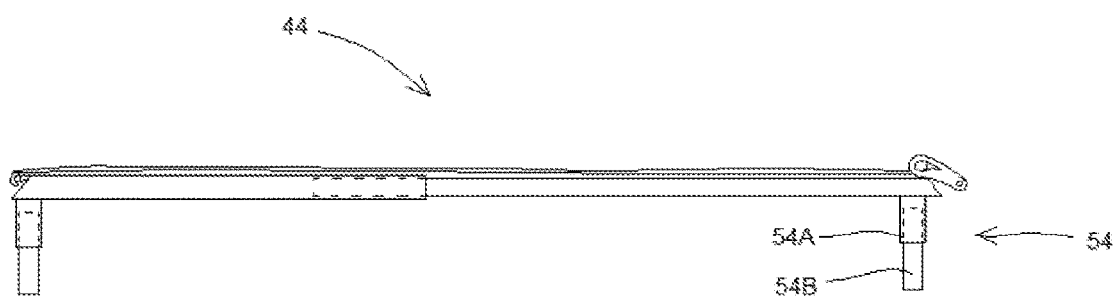
FIG. 37 represents tailgate saver configurations having built-in adjustability in the supports.

The invention described herein is not limited to the above embodiments. For Example, FIG. 36A illustrates an example of a tailgate saver system having a crossbar 44 comprised of a first member 44A and a second member 44B. The first member 44A and the second member 44B may resemble tubes allowing the second member 44B to slide within the first member 44A. For example, the first member 44A may be a rectangular aluminum tube having a square cross-section of a first size and the second member 44B may be a rectangular aluminum tube having a square cross-section small enough to slide within the first cross-section. This telescoping nature allows for an overall length of the crossbar 44 to be adjusted as the second member 44B slides within the first member 44A. The first member 44A may have a through hole extending from one side to another which is alignable with a plurality of holes in the second member 44B. In this way, a length of the crossbar 44 may be controlled by aligning the through hole of the first member 44A with one of the plurality of holes in the second member 44B and then passing a pin through the hole of the first member 44A with the hole of the second member 44B (an example of a adjustment mechanism 50). FIG. 36B illustrates another example of a tailgate saver system having a crossbar with an adjustable length. In this example, the crossbar 44 is comprised of a first member 44A and a second member 44B and an adjustment member 50 (also called an adjustment mechanism). In this specific nonlimiting example embodiment, the first member 44A and the second member 44B may have substantially the same dimensions and the adjustment member 50 may resemble a sleeve into which ends of the first and second members 44A and 44B insert. For example, each of the first and second members 44A and 44B may resemble a square tubing having substantially the same dimensions and the adjustment member 50 may resemble a square tube having a large enough cavity to allow ends of the first member 44A and second member 44B to insert therein. Thus, as the members 44A and 44B slide within the adjustment member 50 the length of the crossbar 44 changes. FIG. 36C illustrates yet another example of a tailgate saver system having and adjustable crossbar 44. In this example, the crossbar 44 is comprised of a first member 44A, a second member 44B, and a third member 44C. The first and second members 44A and 44B may be substantially identical members and the third member 44C may be a member attached to an end of the second member 44A and small enough to slide within a cavity of member 44A. For example, members 44A and 44B may resemble aluminum tubes having a first size and member 44C may be a smaller aluminum tube size having dimensions that allow it to insert into a hollow cavity of the first member 44A. It is understood that these embodiments merely illustrate how a crossbar 44 with any illustrated embodiment, may be made adjustable. It is understood the examples are for purposes of illustration only and are not meant to limit the invention. Furthermore, the above principles may be applied to making the supports 54 adjustable as well. For example, FIG. 37 illustrates a tailgate saver system having supports 54 that are adjustable in nature. As shown in FIG. 38, for example, the supports 54 may be comprised of a first member 54A and a second member 54B which are configured to telescope with respect to one another providing adjustability of support length. Because the teachings of an adjustable crossbar 44 are pertinent to the teachings of an adjustable support 54, a detailed description thereof is omitted for the sake of brevity.

FIG. 38 illustrates another example of a tailgate saver system, however, in FIG. 39, the tailgate saver system is illustrated as having a crossbar comprised of a first member 44A, a second member 44B, and a hinge 44D. The hinge 44D may allow for the crossbar 44 to fold back on itself allowing for even greater conservation of space.

It will be appreciated by those skilled in the art that other various modifications could be made to the device without parting from the spirit and scope of this disclosure. All such modifications and changes fall within the scope of the claims and are intended to be covered thereby.

What is claimed:

1. A tailgate saver system, comprising:
a crossbar;
the crossbar extending a length between opposing ends;
a pair of supports connected to the crossbar;
the pair of supports extending a length between an upper end and a lower end:
a tightening mechanism connected to the crossbar;
a strap connected to the tightening mechanism and the crossbar;
wherein the crossbar is configured to extend across a width of a bed of a pickup truck having a tailgate and stake pockets;
wherein the pair of supports are configured to fit within and be held by the stake pockets of the bed of the pickup truck;
wherein when the pair of supports are inserted in the stake pockets of the bed of the pickup truck the crossbar prevents elongated objects hauled in the bed of the pickup truck from resting on the tailgate thereby allowing the tailgate to be opened and closed.

2. The system of claim 1, wherein the strap and tightening mechanism are configured to press the elongated objects against the crossbar.

3. The system of claim 1, wherein the length of the crossbar is adjustable.

4. The system of claim 1, wherein the crossbar is telescoping so as to adjust the length of the crossbar.

5. The system of claim 1, wherein the pair of supports are connected by a hinge to the crossbar so as to facilitate folding of the pair of supports to reduce space when storing.

6. The system of claim 1, wherein the pair of supports are connected by a hinge to the crossbar so as to facilitate folding of the pair of supports; and wherein the pair of supports are magnetically held in a folded position by a magnet.

7. The system of claim 1, wherein the pair of supports are connected by a hinge to the crossbar so as to facilitate folding of the pair of supports; and wherein the pair of supports are magnetically held in an extended position by a magnet.

8. The system of claim 1, further comprising at least one light connected to the crossbar.

9. The system of claim 1, further comprising at least one light connected to the crossbar and at least one battery connected to the at least one light.

10. The system of claim 1, further comprising at least one light connected to the crossbar, and wherein the at least one light is connected to an electrical system of the pickup truck through a wired connection.

11. The system of claim 1, wherein the crossbar has a rectangular cross-sectional shape.

12. The system of claim 1, wherein the crossbar has a round or oval cross-sectional shape.

13. The system of claim 1, wherein the tightening mechanism is connected to the crossbar in a permanent and affixed manner.

14. The system of claim 1, wherein the tightening mechanism is connected to the crossbar in a removable manner.

15. The system of claim 1, wherein the tightening mechanism is allowed to rotate with respect to the crossbar.

16. The system of claim 1, wherein the tightening mechanism includes a connection mechanism, a frame, a spool and a handle.

17. The system of claim 1, wherein the strap connects to a holder mechanism of the crossbar.

18. A system for protecting a tailgate of a bed of a pickup truck having stake pockets, comprising:
   a first support and a second support;
   the first support and second support extending a length between an upper end and a lower end:
   a sleeve connected to the upper end of the first support;
   a sleeve connected to the upper end of the second support;
   a board inserted within the sleeve of the first support and the sleeve of the second support;
   a tightening mechanism connected to the sleeve of the first support;
   a strap operably connected to the tightening mechanism of the first support;
   the strap operably connected to the second support;
   wherein the first support and second support are configured to be inserted in the stake pockets of the bed of the pickup truck;
   wherein when the first support and the second support are inserted in the stake pockets of the bed, the board extends across the bed adjacent the tailgate thereby preventing elongated objects hauled in the bed from resting on the tailgate thereby allowing the tailgate to be opened and closed when hauling elongated objects.

19. The system of claim 18, wherein the sleeve of the first support and the sleeve of the second support have a tightening mechanism that is configured to tighten the board in place within the sleeve.

20. The system of claim 18, wherein the strap and tightening mechanism are configured to tighten elongated objects against the board.

21. A tailgate saver system, comprising:
   a crossbar;
   the crossbar extending a length between opposing ends;
   a pair of supports connected to the crossbar;
   the pair of supports extending a length between an upper end and a lower end:
   wherein the pair of supports are connected by a hinge to the crossbar so as to facilitate folding of the pair of supports to reduce space when storing;
   wherein the crossbar is configured to extend across a width of a bed of a pickup truck having a tailgate;
   wherein the pair of supports are configured to attached to the bed of the pickup truck; and
   the crossbar prevents elongated objects hauled in the bed of the pickup truck from resting on the tailgate thereby allowing the tailgate to be opened and closed.

22. The system of claim 21, wherein the pickup truck has stake pockets and the pair of supports are configured to fit within and be held by the stake pockets.

23. The system of claim 21, wherein when the pair of supports are inserted in the stake pockets of the bed of the pickup truck.

24. The system of claim 21, further comprising a tightening mechanism connected to the crossbar.

25. The system of claim 24, further comprising a strap connected to the tightening mechanism and the crossbar.

* * * * *

UNITED STATES PATENT AND TRADEMARK OFFICE
CERTIFICATE OF CORRECTION

PATENT NO. : 11,007,923 B2
APPLICATION NO. : 16/512515
DATED : July 16, 2019
INVENTOR(S) : Shawn Michael Estey It is certified that error appears in the above-identified patent and that said Letters Patent is hereby corrected as shown below:

In the Claims

Column 16, Line 45 Claim 1 should read as follows:
1. A tailgate saver system, comprising:
a crossbar;
the crossbar extending a length between opposing ends;
a pair of supports connected to the crossbar;
the pair of supports extending a length between an upper end and a lower end;
a tightening mechanism connected to the crossbar;
a strap connected to the tightening mechanism and the crossbar;
wherein the crossbar is configured to extend across a width of a bed of a pickup
truck having a tailgate and stake pockets;
wherein the pair of supports are configured to fit within and be held by the stake
pockets of the bed of the pickup truck;
wherein when the pair of supports are inserted in the stake pockets of the bed of
the pickup truck the crossbar prevents elongated objects hauled in the bed of the pickup truck from
resting on the tailgate thereby allowing the tailgate to be opened and closed.

Column 17, Line 44 Claim 18 should read as follows:
18. A system for protecting a tailgate of a bed of a pickup truck having stake pockets, comprising:
a first support and a second support;
the first support and second support extending a length between an upper end and
a lower end;
a sleeve connected to the upper end of the first support;
a sleeve connected to the upper end of the second support;
a board inserted within the sleeve of the first support and the sleeve of the second
support;
a tightening mechanism connected to the sleeve of the first support;
a strap operably connected to the tightening mechanism of the first support;
the strap operably connected to the second support;

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,007,923 B2 wherein the first support and second support are configured to be inserted in the stake pockets of the bed of the pickup truck;
wherein when the first support and the second support are inserted in the stake pockets of the bed, the board extends across the bed adjacent the tailgate thereby preventing elongated objects hauled in the bed from resting on the tailgate thereby allowing the tailgate to be opened and closed when hauling elongated objects.

Column 18, Line 23 Claim 21 should read as follows:
21. A tailgate saver system, comprising:
a crossbar;
the crossbar extending a length between opposing ends;
a pair of supports connected to the crossbar;
the pair of supports extending a length between an upper end and a lower end;
wherein the pair of supports are connected by a hinge to the crossbar so as to facilitate folding of the pair of supports to reduce space when storing; wherein the crossbar is configured to extend across a width of a bed of a pickup truck having a tailgate;
wherein the pair of supports are configured to attach to the bed of the pickup truck; and
the crossbar prevents elongated objects hauled in the bed of the pickup truck from resting on the tailgate thereby allowing the tailgate to be opened and closed.

Column 18, Line 42 Claim 23 should read as follows:
23. The system of claim 21, wherein the pair of supports are inserted in the stake pockets of the bed of the pickup truck.